United States Patent [19]

Bayliss et al.

[11] 4,315,310

[45] Feb. 9, 1982

[54] INPUT/OUTPUT DATA PROCESSING SYSTEM

[75] Inventors: John A. Bayliss; George W. Cox, both of Portland, Oreg.; Bert E. Forbes, San Luis Obispo, Calif.; Kevin C. Kahn, Portland, Oreg.

[73] Assignee: Intel Corporation, Santa Clara, Calif.

[21] Appl. No.: 79,991

[22] Filed: Sep. 28, 1979

[51] Int. Cl.³ .................. G06F 3/00; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,573,852 | 4/1971 | Watson et al. | 364/200 |
| 4,044,334 | 8/1977 | Bachman et al. | 364/200 |
| 4,060,849 | 11/1977 | Bienvenu et al. | 364/200 |
| 4,092,715 | 5/1978 | Scriver | 364/200 |
| 4,104,718 | 8/1978 | Poublan et al. | 364/200 |
| 4,149,242 | 4/1979 | Pirz | 364/200 |
| 4,149,244 | 4/1979 | Anderson et al. | 364/200 |

*Primary Examiner*—Mark E. Nussbaum
*Assistant Examiner*—Eddie P. Chan
*Attorney, Agent, or Firm*—Owen L. Lamb

[57] ABSTRACT

An input/output processor architecture for providing an interface between peripheral subsystems and a generalized data processor. The interface processor enables data to be transferred between two address spaces (the generalized data processor address space and an external processor I/O address space) by mapping a portion of the I/O address space into a portion of the GDP address space. This mapping facility provides the peripheral subsystem with a "window" into the associated GDP subsystem. It accepts addresses within a certain subrange, or subranges, and translates them into references into one or more GDP data segments.

A function-request facility provides a functional capability over certain objects within the GDP address space.

The two facilities provide software on an external processor with a window into the address space of the GDP that enables the software, via the function request means, to send messages to and receive messages from the GDP and to manipulate an environment provided for the external processor within its address space.

11 Claims, 7 Drawing Figures

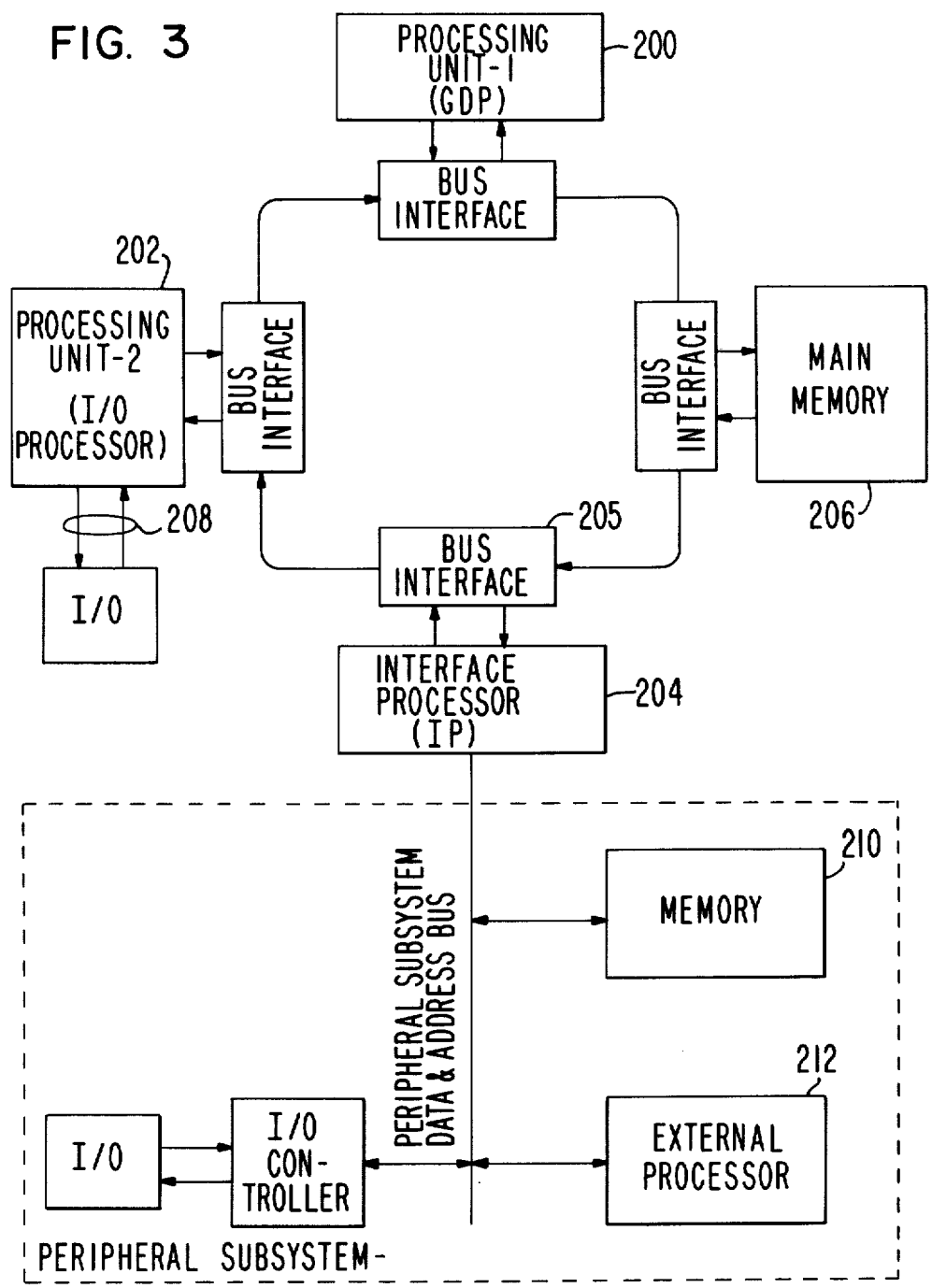

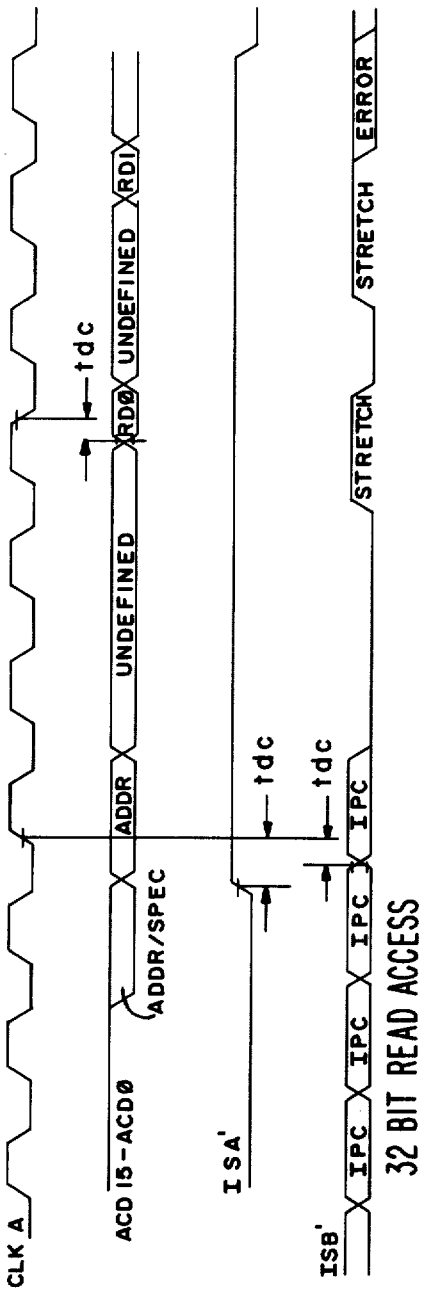
FIG. 5 READ CYCLE
32 BIT READ ACCESS
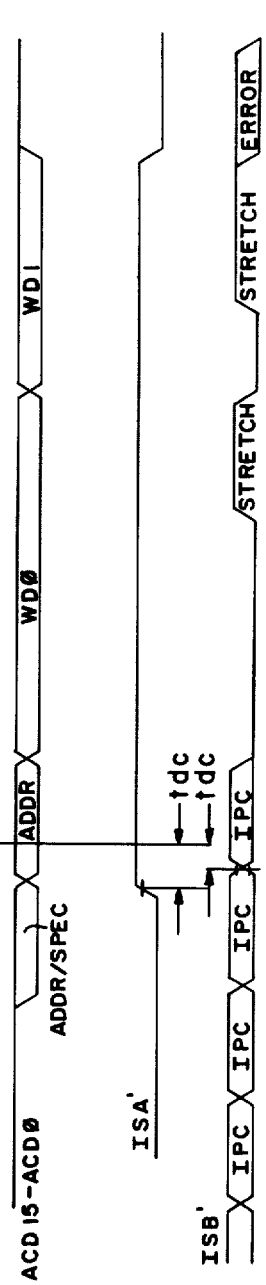
FIG. 6 WRITE CYCLE

INPUT/OUTPUT DATA PROCESSING SYSTEM

BACKGROUND OF THE INVENTION

1. Field of the Invention

The present invention relates to data processing systems, and more particularly to an improved input/output processor for interfacing a number of peripheral subsystems employing different communication disciplines with a general-purpose data processor.

2. Description of the Prior Art

In copending patent application Ser. No. 971,661 of Stephen R. Colley et al, entitled "Data Processing System," filed Dec. 21, 1978, there is disclosed an object-oriented data processor architecture which takes full advantage of recent advances in the state-of-the-art of very large-scale, integrated circuit technology. An object-based access mechanism is employed by both the general-purpose data processors and the input/output processors within the system. An object is a representation of related information maintained in a contiguously addressed set of memory locations. Two basic types of objects are recognized and distinguished by a processor. The first basic type (a data segment) contains ordinary data such as characters, integers, reals, etc. The second basic type (an access list) contains access descriptors. Each access descriptor provides information for locating and defining the extent of access to an object associated with that access descriptor. Processors construct complex objects by combinations of objects of the basic types. Mechanisms within the processor identify the types of complex objects and control their use.

One such complex object, a context, defines an environment made up of objects accessible to a given instance of a procedural operation. Processors recognize context objects and utilize them in process execution.

Two other types of hardware-recognizable objects, buffered communication ports and dispatching ports, are defined to provide communication between processors, and the dispatching of ready-to-run processors for execution, respectively.

The generalized data processors (GDP) perform generalized computation over a wide spectrum of data types supported by this type of processor. The input-/output processor (IOP) transfers data between two address spaces that it has access to and can reference. For example, transferring data from an input device which exists in the I/O address space, into a data segment which exists in the GDP address space.

An IOP uses the same descriptor controlled segment-based address development mechanism as the GDP. The I/O operations also execute in a context-based environment similar to that provided for the GDP. An IOP also uses the same interprocess communication mechanism and IOPs are selected for service via a dispatching mechanism similar to that used by GDPs.

Because an input/output processor must interface with a number of different types of peripheral subsystems in addition to interfacing with generalized data processors, and must handle asynchronous types of operations, the circuitry for such a processor is very complex. This complexity creates certain problems when implementing an input/output processor in large-scale integrated circuit technology. These limitations include limitations on the number of input/output pins which are available on integrated circuit chips and limitations as to the amount of circuitry which can be fabricated on a single chip with current technology. To overcome these limitations, it is desirable to provide an input/output interface which will allow a plurality of different types of existing microprocessors to be connected to and work with the new data processing architecture. With such an arrangement, input/output operations of the type described above can be performed by the external processor, thus reducing the complexity of the input/output processor requirements. There must be provided an interface by which an external processor can be connected to the system and address the main memory as well as function compatibly with the main system's object-oriented architecture. Such an interface must be able to recognize addresses generated by the external processor, and map these addresses onto the address space of main memory. Furthermore, such an interface must be able to allow the external processor to communicate with processes and processors of the main system. The following is a summary of some of the prior approaches to the problem of interfacing a peripheral subsystem to a data processing system.

In Moreton U.S. Pat. No. 4,035,777 a multiprocessing system is disclosed in which each functional unit produces a response signal when it detects its own address on the bus. A port unit is provided on each functional unit chip and stores each address applied to an internal bus to which it is connected. The port unit functions to apply the stored address to the main bus if no response signal is detected within a predetermined time period. Thus, the port unit does not have to be provided with any information about which addresses are on the main bus and which are on the internal bus as it assumes that all addresses which do not produce any response on the internal bus must correspond to the main bus. Thus, in this system, additional units can be added or removed without modifying the port unit.

Each of the functional units contain a plurality of blocks of storage space, and a storage allocation list which maintains a plurality of pointers identifying the blocks of storage. The list of pointers is then used to dynamically allocate storage space by inserting or removing pointers from the list.

This patent does not disclose means for mapping peripheral subsystem addresses onto the address space of main memory, nor does it provide a functional capability over system objects stored in main memory.

Hendrie et al U.S. Pat. No. 4,048,673 discloses an input/output controller (IOC) fabricated on a chip for communication between a CPU and peripheral devices. It includes a 15-bit address and block length registers for block-oriented peripheral data transfer operations. It does not disclose a structure for providing for mapping of addresses.

Bennett et al U.S. Pat. No. 4,069,510 discloses a peripheral interface adapter which is fabricated on a single chip. The patent addresses the problem of interfacing a processor to a variety of peripheral units having varying logical and electrical interfacing requirements. It uses a control register to allow restructuring of the logical functions under program control. This allows address expansion, and redefinition of peripheral interface pins. It does not, however, show the mapping peripheral of addresses into an address space in a common memory.

Davis et al U.S. Pat. No. 4,075,691 discloses a peripheral control unit which includes a small special-purpose programmable computer. A microcode enables this computer to handle the different communication disciplines corresponding to the various peripheral devices. The control unit includes a direct memory-access module (DMA) which generates the starting address in core memory and sends or receives the 16-bit data word. This patent does not disclose the concept of mapping IO addresses onto an address space in a common shared memory.

Larson Defensive Publication T940019 discloses a computer system in which a supervisory program translates input/output "virtual" addresses which are mapped into corresponding real addresses in memory. This publication does not show the concept of mapping a portion of the IO address space in a memory in order to support data transfer between two address spaces whereby data is transferred from IO devices to main memory or is transferred from main memory to IO devices.

It is therefore a primary object of the present invention to provide a new input/output Interface apparatus which is designed to efficiently utilize large-scale, integrated circuit technology.

It is a further object of this invention to provide an input/output architectural structure which supports an object-oriented data processing system architecture and enables compatibility with systems which do not employ that architecture.

It is also an object of this invention to provide a map facility for mapping an address range from the address space of an external processor into the address space of an object-oriented data processor.

It is also an object of this invention to provide apparatus whereby software running on an external processor is given a window into the address space of an object-oriented processor that enables the software, via the execution of a limited subset of main processor instructions, to send and receive messages from said main processor and to manipulate an environment provided for the external software within the main processor address space.

BRIEF SUMMARY OF THE INVENTION

Briefly, the above objects are accomplished in accordance with the invention by providing an interface processor which employs an object-based access mechanism which is compatible with an object-based generalized data processor architecture. The GDP architecture is capable of recognizing a complex object which defines an environment in an address space associated with said GDP for execution of objects accessible to a given instance of a procedural operation. The interface processor enables external processors and their associated buses to interface with said GDP by providing a mapping facility and a function-request facility. The mapping facility includes means for mapping an address range from the address space of said external processor into the address space of said GDP. The function-request facility provides a functional capability over certain objects within said GDP address space, that can be requested by software running on said external processor. Thus, software on said external processor is given a window into the address space of said GDP that enables the software, via the function-request facility, to send messages to and receive messages from the GDP, and to manipulate an environment provided for said external processor within the GDP address space.

The present invention has the advantage that from the peripheral subsystem side the interface processor reacts like a memory device, by receiving address and command signals and responding with a ready or acknowledge signal. While, from the GDP side the interface processor reacts as a processor with a limited instruction set capable of GDP address generation and capable of performing a subset of the GDP communication operators.

A further advantage is that the peripheral subsystem processor can communicate with a GDP process or be controlled by that process, by invoking previously-defined architectural mechanisms.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein:

FIG. 3 is a block diagram of a computer system of a type in which the invention may be embodied;

FIG. 5 is a timing diagram of a typical read cycle; and

FIG. 6 is a timing diagram of a typical write cycle.

TABLE OF CONTENTS

Figure 1:
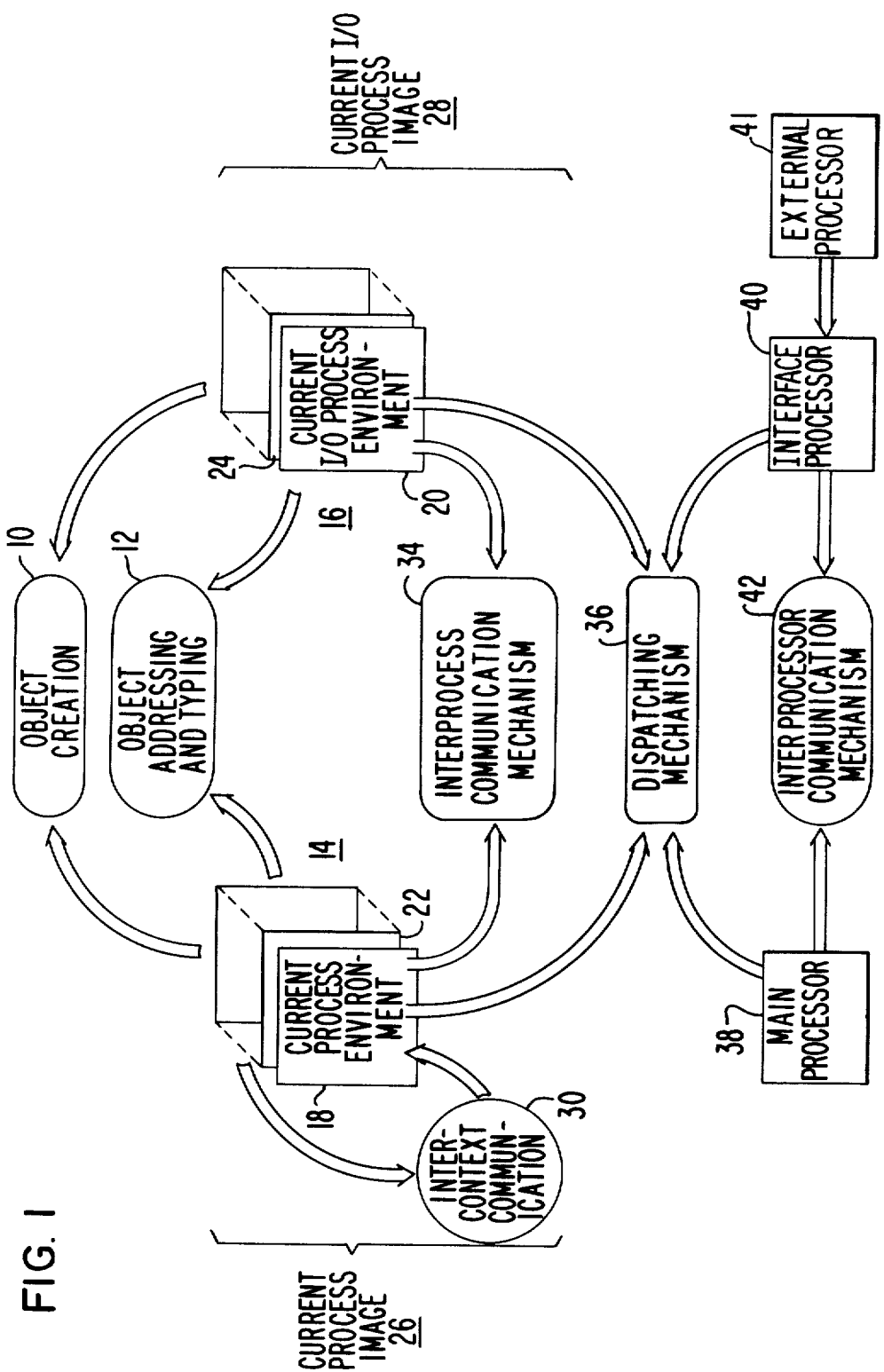
FIG. 1 is a functional block diagram illustrating the invention in relation to other components of a data processing system.

Background of the Invention
Brief Summary of the Invention
Brief Description of the Drawings
Table of Contents
Introductory Description of the Invention

Part I - Interface Processor Architecture 1.0 Overall System
   1.1 Basic Structures and Facilities
   1.2 Peripheral Subsystem Address Mapping
   1.3 Compatibility Facilities
   1.4 System Configuration
   1.5 System Initialization
2.0 Information Structure
   2.1 Memory
      2.1.1 Logical Addressing
      2.1.2 Physical Addressing
   2.2 Operand Formats
   2.3 Operand Representation
   2.4 Operand Positioning
   2.5 Operand Integrity
   2.6 Instruction Positioning
   2.7 Peripheral Interface Addressing
3.0 Input/Output Processing
   3.1 Computational Data Types
   3.2 Environment Manipulation
   3.3 Instruction Composition
      3.3.1 Types of Operands
      3.3.2 Operators
      3.3.3 Data Operands
      3.3.4 Access Descriptor Operands
4.0 Interface Processor Object Structures
   4.1 Segments
   4.2 Contexts
      4.2.1 Context Objects
          4.2.1.1 Context Control Segments
              4.2.1.1.1 Mapping Facility Area
              4.2.1.1.2 Function Request Facility Area
              4.2.1.1.3 Fault Information Area
   4.3 Processes
      4.3.1 Process Control Segments
          4.3.1.1 Process Control Segments
          4.3.1.2 Current Service and Buffered

TABLE OF CONTENTS-continued

Background of the Invention
Brief Summary of the Invention
Brief Description of the Drawings
Table of Contents
Introductory Description of the Invention

```
            Ports
      4.3.1.3  Fault Buffered Ports
      4.3.1.4  Fault Access Descriptor
    4.3.2  Buffered Communication Ports
  4.4  Processors
    4.4.1  Processor Objects
      4.4.1.1  Processor Control Segments
        4.4.1.1.1  Interprocessor
                   Messages
        4.4.1.1.2  Processor Fault
                   Information
    4.4.2  Dispatching Ports
      4.4.2.1  Alarm Dispatching Ports
      4.4.2.2  Fault Buffered Ports
      4.4.2.3  Fault Access Descriptors
  4.5  Storage Resources, Transformers, and Labels
  4.6  Processor Registers
5.0  Interface Processor Facilities
  5.1  Peripheral Subsystem Address Mapping Mechanisms
  5.2  Compatibility Mechanisms
    5.2.1  Request Protocol
    5.2.2  Environment Manipulation
    5.2.3  Communication
      5.2.3.1  Process-to-Process
               Communication
      5.2.3.2  Processor-to-Processor
               Communication
    5.2.4  A Typical Transfer Cycle
  5.3  Exception Handling
    5.3.1  Notification
    5.3.2  Fault Mechanism Data Structures
    5.3.3  Context-Level Faults
      5.3.3.1  Object Access Faults
      5.3.3.2  Displacement Faults
      5.3.3.3  Descriptor Control Faults
      5.3.3.4  Interlock Failure Faults
    5.3.4  Process-Level Faults
      5.3.4.1  Reference Validity Faults
      5.3.4.2  Context Fault Failure Faults
      5.3.4.3  Segment Descriptor Allocation
               Faults
      5.3.4.4  Nonrestartable Faults
        5.3.4.4.1  Communication
                   Instruction Faults
        5.3.4.4.2  Storage Allocation
                   Faults
    5.3.5  Processor-Level Faults
      5.3.5.1  Process-Level Fault Failure
               Faults
      5.3.5.2  Faults Without A Process
    5.3.6  Consistency Halts
  5.4  Debugging Support
  5.5  Low-Level Initialization
  5.6  Initialization And Software-Controlled Reset
  5.7  Alarm Handling
6.0  Interface Processor Functions
  6.1  Op-Code Field
  6.2  Operands Field
    6.2.1  Data Operands
    6.2.2  Access Descriptor Operands
  6.3  Function Interpretation
    6.3.1  Physical Address Generation
    6.3.2  Execution
7.0  Interface Processor Operator Set
  7.1  Access Environment Manipulation Operators
    7.1.1  Access Descriptor Movement Operators
    7.1.2  Context Manipulation Operators
    7.1.3  Map Manipulation Operators
    7.1.4  Type and Rights Manipulation Operators
    7.1.5  Label Manipulation Operators
    7.1.6  Access Path Inspection Operators
  7.2  Communication Operators
    7.2.1  Process Communication Operators
    7.2.2  Processor Communication Operators
Part II - Interface Processor (IP) and System Interconnections
8.0  Introduction
```

TABLE OF CONTENTS-continued

Background of the Invention
Brief Summary of the Invention
Brief Description of the Drawings
Table of Contents
Introductory Description of the Invention

```
    8.1  Pin Description
9.0   General Description
    9.1  Address Recognition
    9.2  Mapper
    9.3  PRI I/O Logic
    9.4  ROM
    9.5  Microprocessor Execution Unit
10.0  Peripheral Subsystem Bus Operation
11.0  Summary of Interface Processor Operation
```

INTRODUCTORY DESCRIPTION OF THE INVENTION

Referring now to FIG. 1, the following introductory description broadly describes the various elements of the system in which the invention is embodied and provides an introduction to some of the terminology used throughout the following specification. A data processing system of the type in which the present invention may be embodied is more fully described in copending patent application entitled "Data Processing System," by Stephen R. Colley, et al, application Ser. No. 971,661, filed on Dec. 21, 1978. FIG. 1 illustrates the various agents in the data processing system described in the Colley et al patent application and the mechanisms that these agents utilize. FIG. 1 also illustrates how the present invention interacts with the overall system. Arrows in the figure denote the following. The agent is located at the source of the arrow and the mechanism that the agent is using is located at the destination of the arrow. Two kinds of agents are shown, processes that are in a particular state, and the processors that the processes are executed on.

The Colley et al patent application discloses a data processor architecture which provides an object-based access mechanism which is employed by processors within the system. An object is a representation of related information maintained in a contiguously addressed set of memory locations. Two basic types of objects are recognized and distinguished by a processor. The first basic type (a data segment) contains ordinary data such as characters, integers, reals, etc. The second basic type (an access list) contains access descriptors. Each access descriptor provides information for locating and defining the extent of access to an object associated with that access descriptor. Processors construct complex objects by combinations of objects of the basic types. Mechanisms within a processor identify the types of complex objects and control their use.

One such complex object, a context, defines an environment made up of objects accessible to a given instance of a procedural operation. Processors recognize context objects and utilize them in process execution.

The architecture also provides the following hardware-recognizable objects: buffered communication ports and dispatching ports.

A buffered communication port is responsive to a currently running process and provides the means for communication between processes. This is illustrated by the interprocess communication mechanism (34) shown in FIG. 1. Each buffered port includes a dual-purpose queue for queuing messages which have been sent and for queuing processes that are waiting to receive a message.

Dispatching ports and buffered ports are utilized in the dispatching of ready-to-run processes for execution by an available processor. The dispatching mechanism (36) is shown in FIG. 1. Each dispatching port includes separate queuing means for queuing processes sent from a buffered port for execution, and for queuing processors that are available to receive a process for execution thereof.

As just described, the interprocess communication mechanism (34) is utilized to bind a message to a process, and the dispatching mechanism (36) is utilized to bind the process to an available processor, for execution. The processor with the service request (a message/process pair) examines the appropriate dispatching port. If no processor is queued at that port, then the service request is queued at the port to wait for an available processor. If there had been a processor queued at the dispatching port awaiting the arrival of a service request, then the processor with such a service request can bind the service request to the waiting processor. An interprocessor communication mechanism (42) is provided so that the requesting processor is able to communicate to the waiting processor that it can begin executing the process which has been bound to it.

The interprocessor communication mechanism has several other uses as more fully described in the above-identified Colley et al patent application.

Two types of processors are described in the above-identified Colley et al patent application, generalized data processors (GDP) and IO processors (IOP). A third type of processor referred to in this specification as a peripheral subsystem processor, is the logical combination of an external processor within a peripheral subsystem and an interface processor (IP), as contemplated by the present invention. The IP enables an external processor, such as an Intel 8085, 8086, 8088, etc., to interface with the data processing system and communicate with a GDP process or be controlled by that process.

An interface processor provides two fundamental facilities, a mapping facility and a function-request facility. The address-mapping facility allows the external processor to transfer data between two address spaces (the GDP address space and the IO address space) by mapping a portion of the peripheral subsystem address space into a portion of the GDP address space. This mapping facility provides the peripheral subsystem with a "window" into the associated GDP system. The IP accepts addresses from the external processor within a certain subrange, or subranges, and translates them into references into one or more GDP data segments.

The function-request facility is provided to execute functions which enable the IP to bring an attached external processor up to the architectural level of a generalized data processor. The function-request facility executes an extended instruction set which is available to software running on the external processor to enable that software to perform certain functions which are available to other processors (GDP or IOP processors) on the system. This mechanism allows an extent of control and manipulation over objects within the GDP address space. One such function enables software on the external processor to receive messages (such as are transmitted between processes within the GDP address space) across the IO interface. Conversely, a function is provided to enable an external processor to send a message across the IO interface to a process operating within the GDP address space. A set of operators is therefore available by means of the function-request facility for use by software on the external processor. There are basically two types of operators, operators for communication, such as send message, or wait to receive message, and access-environment manipulation operators which allow the software on the external processor to manipulate the environment in terms of the access descriptors which describe that environment. This environment, 16 in FIG. 1, is provided in the GDP address space for the external processor.

There is provided for a process running on a GDP or main processor (38) a current process environment (18). The process environment includes a context object associated with the instructions being executed by the process. This context object describes an accessing environment for software which is running in the context. The same kind of environment (20), but not including unnecessary facilities, is provided for an external processor (41) interfacing with the system through an interface processor (40). Since an interface processor has no need for an operand stack, the context being used by the external processor does not include such a stack. Also, the fault-handling mechanisms employed by an IP are different than those employed by a GDP.

Interface processors have no sequential instruction stream, and therefore no intercontext or intracontext communication mechanism is provided.

Assume now that there is a process running on a GDP (38) within the system, and that the process needs a data transfer from an IO device. The following describes how a data transfer is requested, how the request is performed by software on the external processor, and how the results of that data transfer (completion code information, etc.) is transmitted back into the GDP system.

The process running on the GDP sends a message, asynchronously, to the process running on the external processor by means of the interprocess communication mechanism (34) associated with the context object stored in main memory and associated with the IO process (20). The IO process responds to the message by performing the IO data transfer. The process running on the external processor then sends a message back to the GDP process indicating that the data transfer has been completed. This operation is similar to that described for an IO processor in the above-identified Colley et al patent application. The difference is that an external processor lacks compatible instructions and interfacing to operate within the address space of the main memory. In order to accommodate the external processor, the IP has a function-request facility. The external processor sends a command via a command interface to the IP to execute a wait-to-receive-a-message operator. The external processor will then halt or go into an idle loop until that message arrives. The IP is designed so that the external processor merely treats the function-request facility as a peripheral interface when asking for the functions to be done. This is accomplished by writing a bit pattern into a command register of the IP. The external processor also sets up a status register signifying whether it wants an interrupt at the completion of the function. The software can then halt or go into a loop testing the status information. The interface processor then performs the requested function just as a peripheral would, in this example, the wait-to-receive-a-message operator. In executing the wait-to-receive-a-message operator, the IP uses the information in the command register to find the appropriate buffered communication port by means of the access information within its context object (representing the environment within the main memory available to software running on the external processor). Upon locating the communication port the IP will find a message deposited there by a process running on the GDP. The IP then places the access descriptor for the message into the context object for the IO process. The IP then signals completion by posting status or by interrupting the external processor. The external processor then responds to the interrupt, or responds upon testing status, by issuing addresses which are mapped into main memory by means of the address map in the IP. Upon having transferred all the addresses specified in the message, the software on the external processor notifies the process running on the GDP of completion by writing a bit pattern into the command register. This bit pattern requests that the information be sent back to a specified communication port through the interprocess communication mechanism (34). Thus the software on the external processor has performed two functions. First, it asked to receive a message, and second, after receiving a message, it sent a message to the communication port specified in the received message. The external processor can now return to the instruction code that request another message, i.e., the wait-for-message operator.

PART I-INTERFACE PROCESSOR (IP) ARCHITECTURE

1.0 OVERALL SYSTEM

The Interface Processor (IP) serves as a "compatibility" component to support interfacing all sorts of "alien" components and boards, henceforth called "peripheral subsystems," to Generalized Data Processor (GDP) systems.

Generalized Data Processors (GDPs), as defined in the above-identified Colley et al patent application, function within a GDP address space and can only reference objects within that space. Interface Processors (IPs), as defined herein, function at the boundary between two address spaces. The first is a GDP or main processor address space, and the second is called a peripheral subsystem or external processor address space.

Positioned as they are at the boundary between two address spaces, interface processors present two different views of themselves: one to the associated peripheral subsystem and one to the GDP system. The main purpose of interface processors is to transfer data between these two address spaces by "mapping" of a portion of the peripheral subsystem address space onto a portion of the GDP address space. A secondary purpose of interface processors is to provide a level of functional compatibility between software in the GDP system and software in the peripheral subsystem. Given these two roles to fulfill, an interface processor provides the impression to the associated peripheral subsystem of being composed of one or more memory modules and a memory-mapped peripheral interface. The view provided to the GDP system is quite different. As described in the next section, on the GDP side an interface processor looks much like any other GDP processor. When describing the interface processor in this document, each point of view is used when appropriate. For example, from the peripheral subsystem viewpoint the compatibility mechanisms are made available by a set of functions that can be requested via the peripheral interface. From the GDP point of view, each of these functions, when executed by an interface processor, is indistinguishable from the same function being performed as part of the corresponding instruction on a generalized data processor. Functions and instructions are thus synonymous when both points of view are considered.

1.1 BASIC STRUCTURES AND FACILITIES

Interface processors use the same descriptor-controlled, segment-based, address-development mechanism as used by all processors. Interface processors also provide four-component, context-based environments similar to those provided on generalized data processors. Basically the same environment manipulation facilities are available as on other processors. Interprocess communication is supported via the same message-based mechanism used by other processors. Interface processor processes are selected for service via the same dispatching mechanism used by other processors. Interprocessor communication mechanisms are similar. Storage allocation, base/system-type management and extended-type management employ the same mechanisms. Exception handling and debugging necessarily employ different mechanisms.

1.2 PERIPHERAL SUBSYSTEM ADDRESS MAPPING

For an object-oriented data processing system to directly share all or part of an address space with a peripheral subsystem would subvert the addressing-related protection mechanism of the system. Thus, to directly interface a peripheral subsystem to such a data processing system, what is needed is some way to control the reference patterns of such peripheral subsystems. Such control must at least apply to any components of a peripheral subsystem address space shared with such system.

The interface processor supports the mapping of all or part of the addresses available to a given peripheral subsystem into the system address space. This "mapping facility" provides the peripheral subsystem with a "window" into the associated system. It accepts addresses within a certain subrange or subranges and translates them into references into one or more data segments. The number of address subranges, their sizes, the variability of the location and length of these subranges, and the representation and semantics associated with the related environment within the system are described in sections 4 and 5.

1.3 COMPATIBILITY FACILITIES

Beyond simple address-mapping compatibility, an interface processor makes other compatibility facilities available to software within an associated peripheral subsystem.

Assume that some external processor (e.g., an Intel 8085, an Intel 8088, or an Intel 8086) within the peripheral subsystem provides the necessary data manipulation facilities for that subsystem. The only additional services, beyond address mapping, likely to be required by the peripheral subsystem of the object-oriented main processor system are those unique to such systems (e.g., hardware-supported interprocess communication). For example, software within a peripheral subsystem might need to inform some managing process within the associated main processor system upon completion of a data transfer. These operators are provided via the "function-request facility" of the interface processor. The level of communication supported and the request protocol employed (i.e., command level) are described in sections 4 and 5.

1.4 SYSTEM CONFIGURATION

FIG. 1 represents the system configuration in which all interface processors will find themselves used. More detailed information on possible physical system configurations can be found in Part II of this specification.

There are several advantages to the above approach. It allows any active agent in a peripheral subsystem (called "external processors") to be brought up to main processor system addressing standards for the part of their address space within the associated system. It supports the use of all past and future peripheral subsystems produced by either Intel or other manufacturers as long as they can interface to the bus protocol supported by the interface processor. It encourages buffering to support peak data rates via memory in the peripheral subsystem close to the source/destination. It supports more distributed intelligence in peripheral subsystems (i.e., ones controlled by nonobject-oriented processors). When used as purely a mapping facility, it is a completely passive agent from the point of view of the peripheral subsystem. In fact, the peripheral subsystem need not know that some of its addresses are being mapped.

As described in section 4, the problem of supporting high speed peripheral controllers is avoided by providing special support for block transfers through some of the mapped address subranges.

1.5 SYSTEM INITIALIZATION

At system initialization, the temporary segment table directory and associated data structures (described more fully in section 4.1 of the above-referenced Colley et al patent application) must be initialized prior to any processor beginning the initialization sequence. This information cannot preexist in the required locations (i.e., be encoded there in a ROM) because it is subject to later change. Thus, the required information is moved into the required locations from an image encoded in ROM or PROM elsewhere in the system. Since none of the processors in the system have yet qualified any of their address development information, the processor performing this low level initialization must work at the physical address level. This movement is performed via a designated IP.

2.0 INFORMATION STRUCTURE

The memory component of a system is made up of one main processor address space and one or more peripheral subsystem address spaces, each containing some amount of read/write and read-only memory. All main processors (of any type) in a system can access the contents of all of the main processor address space. By mapping given peripheral subsystem address subranges into data segments in the associated main processor address space, interface processors provide external processors access to parts of the associated main processor address space. This section describes how information is represented and accessed in the main processor address space.

2.1 MEMORY

The main processor address space is implemented as a two-level memory structure. Any main processor software system exists in a segmented environment in which a logical address specifies the location of an operand. The processor automatically translates this logical address into a physical address for accessing the value in physical memory.

2.1.1 Logical Addressing

A main processor address space is partitioned into many segments. A segment is a group of contiguously addressed memory bytes, where a byte contains eight binary bits of information. A segment may be of any length from 1 to 65,536 bytes.

The instructions of an operation being executed by an external processor (including those executed by the associated interface processor upon request) have access to the information contained within the segments that make up its current context. Instructions executed by an external processor may cause the generation of one or more peripheral subsystem addresses. Those peripheral subsystem addresses which are to be mapped into the main processor address space are translated into main processor logical addresses. As part of the execution of functions requested by external processor software, interface processors make reference to operands using logical addresses.

Normally, main processor logical addresses for data operands have two components: a segment selector and an operand displacement. The segment selector specifies an index to an entry in one of the current context's primary access lists. That entry indirectly specifies the memory segment that contains the operand. The operand displacement is the offset to the beginning byte of the desired operand from the base of the chosen segment. At mapping facility setup time, each mapped peripheral subsystem address subrange is directly associated with a given main processor data segment. Thus, no segment selector component is required dynamically. The dynamic displacement into the subrange is used as the operand displacement.

The maximum logical address space of a software system is limited to U.S. Pat. No. 2,097,152 segments of 65,536 bytes each for a total of 137,438,953,472 bytes.

2.1.2 Physical Addressing

Logical addresses are translated by the processor into physical addresses much as explained in section 7 of the above-identified Colley et al patent application. The only major differences are that no caching for segment tables or data segments is done. Physical addresses are transmitted to memory by a processor to select the beginning byte of a memory value to be referenced. A physical address within the main processor address space is 24 binary bits in length. This results in a physical memory size limit for the main processor address space of 16,777,216 bytes. A physical address within a peripheral subsystem address space recognizable by an interface processor is 16 binary bits in length. This results in a physical memory subrange size limit for an interface processor of 65,536 bytes.

2.2 OPERAND FORMATS

When an external processor executes instructions which generate addresses mapped by the mapping facility, it manipulates data operands found in the data segments of the current context. An individual data operand may occupy one or two bytes of memory or a byte or double byte respectively. When an interface processor executes operators, upon request from an external processor, it manipulates data and/or access descriptor operands either encoded as literals in the registers of the function-request facility or found in the segments of the current context. An individual access descriptor operand always occupies four bytes of memory or a word. All operands are referenced as described above. The displacement in such an address is the displacement in bytes from the base address of the segment to the first byte of the operand. For operands consisting of multiple bytes, the address locates the low-order byte, and the higher-order bytes are found at the next higher consecutive addresses.

2.3 OPERAND REPRESENTATION

A convention for representing data and access descriptor structures that are stored in memory is described in section 2.3 of the above-identified Colley et al patent application. This convention is used herein. The bits in a field are numbered by increasing numeric significance, with the least-significant bit shown on the right. Increasing byte addresses are shown from right to left.

2.4 OPERAND POSITIONING

The data structures discussed above may be aligned on an arbitrary byte boundary within a data segment. Note that more efficient system operation may be obtained when multibyte data structures are aligned on double-byte boundaries if the memory system is organized in units of double bytes. The access descriptor structures discussed above may be aligned only on a word boundary within an access list segment.

2.5 OPERAND INTEGRITY

The multiprocessor architecture described in the above-identified Colley et al patent application places certain requirements on the operation of the memory system to ensure the integrity of operands that can potentially be accessed simultaneously. Indivisible read-modify-write (RMW) operations to both double-byte and word operands in memory are necessary for manipulating system objects. From the time a RMW-read is processed for a location in memory, any other RMW-reads to that location must be held off by the memory system until a RMW-write to that location is received (or until a RMW timeout occurs). Also for ordinary reads and writes of double-byte or longer operands, the memory system must ensure that the entire operand has been either read or written before beginning to process another access to the same location. Otherwise, for instance, as a result of two simultaneous writes to the same location (by two processors), the set of locations used to store the operand could contain some interleaved combination of the two written values.

2.6 INSTRUCTION POSITIONING

With the interface processor, there is no concept of a sequential instruction stream. Rather, the operators provided by the interface processor, via the function request facility, can be considered as instruction set extensions to the operator set of the associated external processor. These extensions allow software executing on the external processor to manipulate the environment provided for it in the main processor address space. It is expected that the execution of operators by the interface processor will be interspersed, upon request by external processor software, with the execution of operators provided by the external processor. Interface processor operators are requested and then executed one at a time. Any time an interface processor is executing a requested operator, it will not accept further operator execution requests.

2.7 PERIPHERAL INTERFACE ADDRESSING

From the peripheral subsystem point of view, the interface processor appears to be a combination of several memory module interfaces (i.e., equal to the number of peripheral subsystem address subranges being mapped) and a memory-mapped peripheral interface. Actually, the memory modules represented by the mapped subranges are really implemented as part of the main processor address space. The peripheral interface, which is really just another mapped subrange, is represented both by information in registers in the interface processor and by a copy of that information in the main processor address space. What are logically the memory module interfaces are selected by a 16-bit physical memory addresses within given subranges of the peripheral subsystem address space. To access an individual data operand in one of those memory modules, the external processor instruction specifies an address in the subrange associated with the segment in which the data operand is really found. The displacement into that subrange is used as an operand-selecting displacement into that segment. What are logically the command, status, and data registers of the memory-mapped peripheral interface are also selected by 16-bit physical memory addresses within a given subrange of the peripheral subsystem address space. To access an individual register in the peripheral interface, the external processor instruction specifies an address in the subrange in which the peripheral interface registers are really found. The displacement into that subrange is used as a register-selecting displacement into that segment.

Three methods are available for synchronizing interface processors with their controlling external processors. When in randon (i.e., nonblock) transfer mode, each active mapping facility subrange responds to addresses within it and the associated control signals just as would a memory module of that size and characteristics (i.e., RAM/ROM/PROM, latency, etc.). That is, it uses address reception as a stimulus. When in block transfer mode, each active mapping-facility subrange can be setup to use either address reception stimulus or request/address reception stimulus. In either case, when in block transfer mode, a mapping facility transfers data in only one direction based upon an internally-generated displacement. If an internally-generated displacement is used, with block transfers the address received serves only as a stimulus and plays no part in the displacement computation. This mechanism provides for both "swept" and "source/sink" types of transfers. The view taken with the "swept" approach is that a block of data is being transferred to/from a block of memory which is swept by a sequence of addresses. The view taken with the "source/sink" approach is that a block of data is being transferred to/from a single memory location which is addressed again and again until the block of data has been transferred. Request/address synchronization is provided to allow for better peripheral subsystem bus utilization. An interface processor accomplishes this by generating a transfer request signal to indicate its desire either to have data stored into or to have data removed from a particular associated register. The external processor will respond by generating the appropriate physical memory address. The interface processor then uses that stimulus to gate the associated data on to or off of the peripheral subsystem bus.

4.0 INTERFACE PROCESSOR OBJECT STRUCTURES

All main processors (GDPs and IOPs) make extensive use of nonprimitive, hardware-recognized, data structures to represent the various system objects defined in its functional hierarchy. For convenience, efficiency, and logical consistency, the data structures for these system objects are built from data of the primitive types described in section 3 of the above-identified Colley et al application. This allows them to be created and manipulated by any generalized data processor, without circumventing the safety and protection of the access mechanisms.

The facilities that support the recognition and use of system objects also provide for the constant checking of both their type and structure prior to use. Should a deviation from either specification be detected by a processor, an exception is recognized. Such exceptions may either be events of which software must be made aware but which do not preclude continued execution of the current instruction stream or they may be events which require immediate software attention. A number of such exceptions are described in this section. A detailed description of the exception-handling mechanisms appears in section 5.

4.1 SEGMENTS

The use of the segment as the logical basis for every type of system object is fundamental as segments form the foundation for all address development and access control. Segments also serve as the building blocks for all larger and more specialized computational objects and are the basis for realizing a multilevel or virtual memory capability. Normally, a single segment is sufficient to contain the data structure defined for a system object. In those cases, however, where a system object is a composite of primitive data and other system objects, a number of segments may be used.

When referencing the main processor address space, interface processors use the same access-descriptor-controlled, segment-based, address-development mechanism used by other processors.

4.2 CONTEXTS

In the most general terms, contexts for interface processors and generalized data processors serve the same purpose. They are used to represent an access environment in which process execution can take place. On closer inspection, however, the differences are significant. For example, with interface processors there is no concept of a sequential instruction stream. Instead the only instructions executed by interface processors are functions requested, one at a time, by software executing on the associated external processor. At a mundane level, this means that interface processor contexts need not provide access to instruction segments or operand stacks. More significantly, without a sequential instruction stream there are no concepts of intracontext or intercontext control flow either. This results in the binding between interface processor processes and contexts being static.

An interface processor context is used to represent the access environment available within the main processor system to the logical process being executed on the logical processor comprised of the interface processor and the associated external processor. The operators provided by the external processor affect the contents of data segment in this environment via the address mapping facility of the interface processor. The operators provided by the interface processor affect this environment via the function-request facility of the interface processor.

4.2.1 Context Objects

Figure 2A:
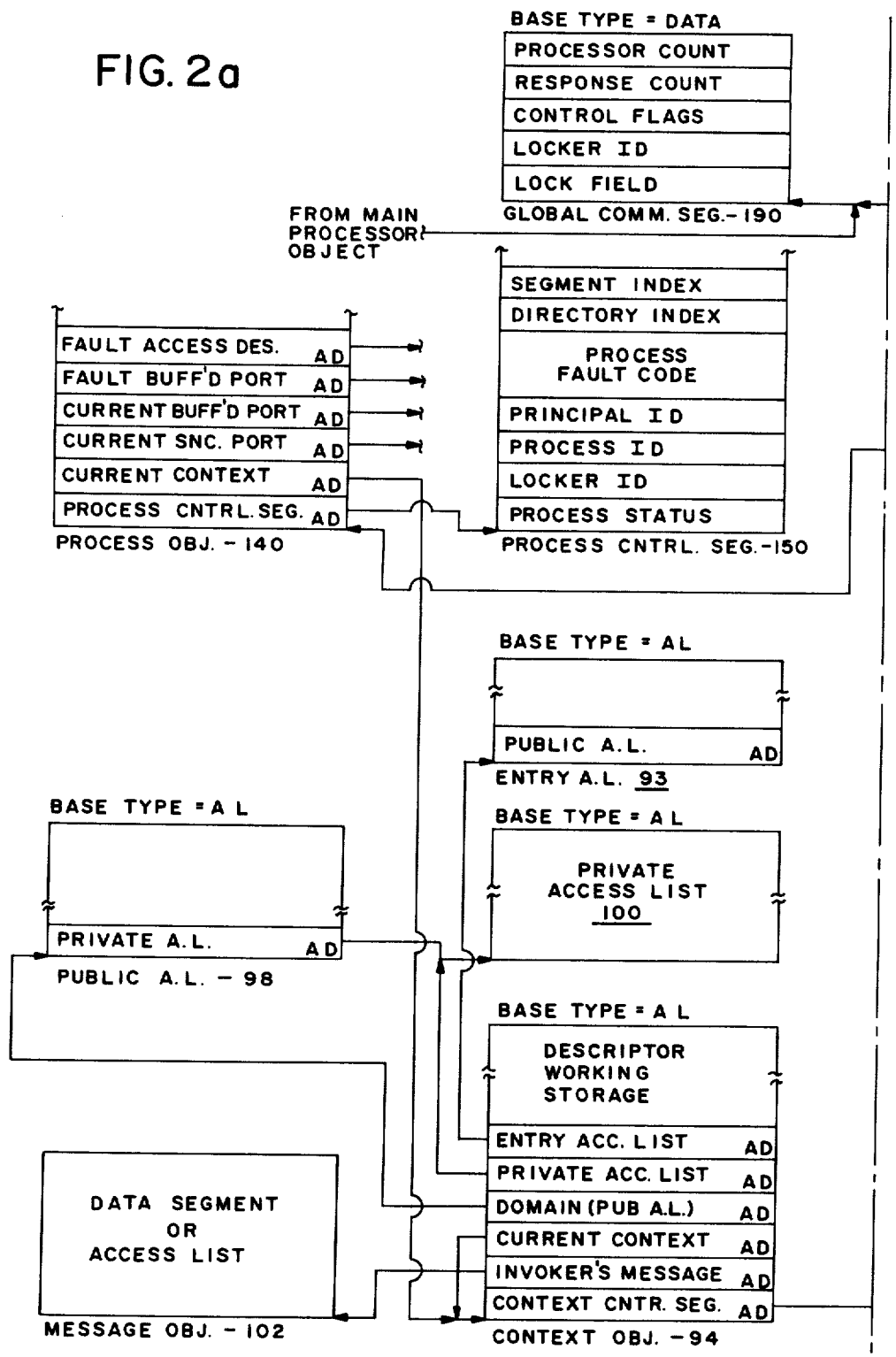
FIGS. 2A and 2B, taken together, are a block diagram of system objects for supporting input/output operations.

Referring to FIG. 2A, each context object consists of at least six access descriptors. Moving up from the lowest position in the context object, the first descriptor is an access descriptor for the context control segment. The next is replaced when the context is actually invoked by an access descriptor for the message passed to that context, if any. The third access descriptor is an access descriptor for the context itself. The next two descriptors are the public and private access lists of the domain in which the context's operation was defined. The sixth access descriptor is replaced dynamically whenever the associated operation selects a new entry access list. The rest of the context object, above those entries defined above, is intended for use as descriptor working storage for the context. The base rights field of a context object access descriptor is interpreted in the same manner as for all objects of base-type access list. The system-rights field of a context-object access descriptor is uninterpreted.

4.2.1.1 Context Control Segments

Figure 2B:
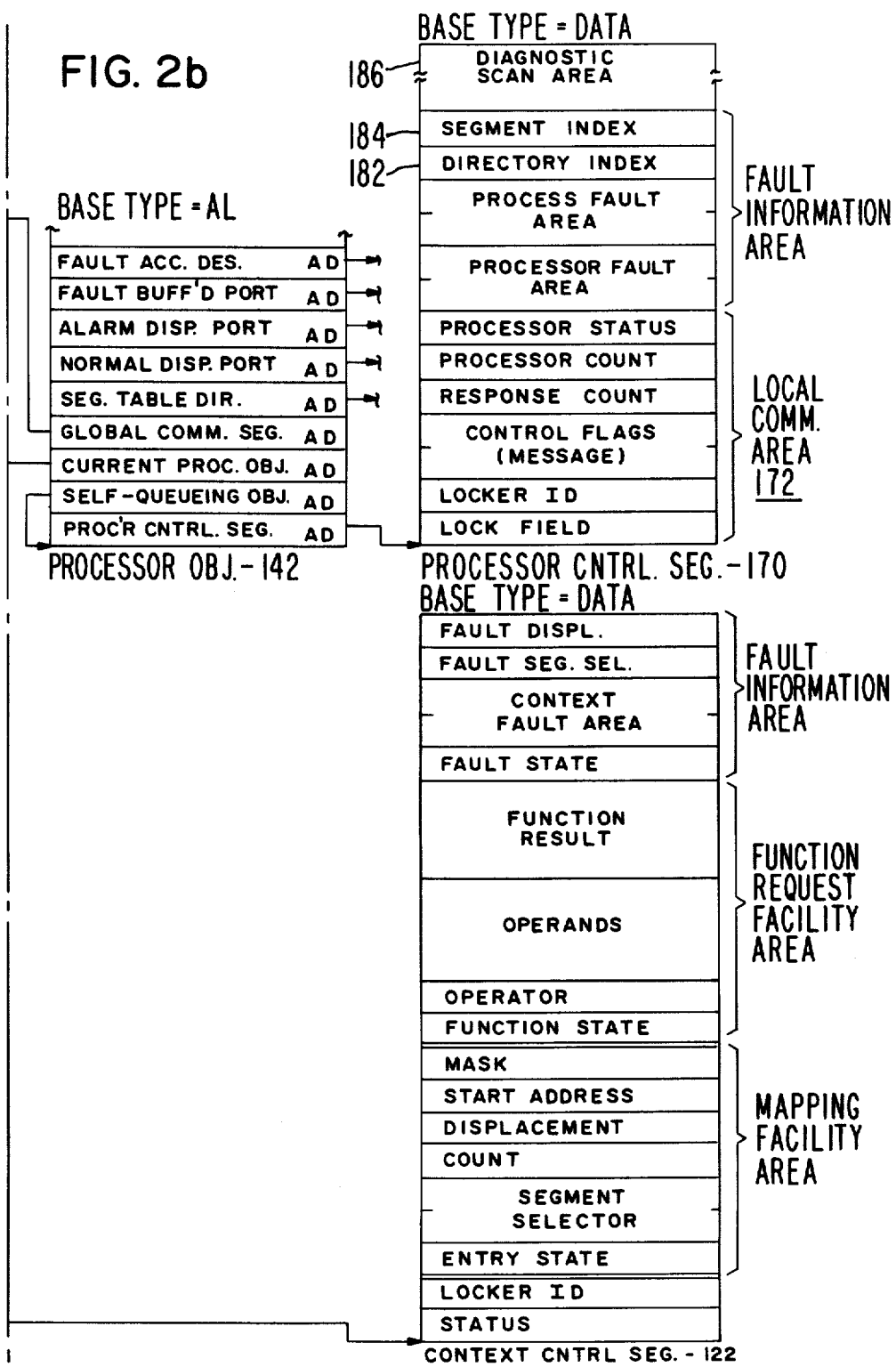

Each context object contains an access descriptor for an associated context control segment (FIG. 2B). The intended use of this data segment is as instance specific control information, for recording a copy of the processor-resident information contained in the function request facility and the mapping facility, for recording fault information, and as randomlyaddressable scalar working storage. Note that each of the processor-resident copies of the various state fields described below (i.e., context status, map entry state, function state, and fault state) are interlocked with respect to further change once a state change occurs. Other state changes are disallowed until the given state field has been read by external processor software. This prevents loss of any status information. Future revisions of this document will provide complete descriptions of these interlocks. The copy of processor-resident information in the context-control segment is updated by the processor whenever a significant state to that information occurs (i.e., function completion or block transfer completion).

The first double byte in the context-control segment contains context status information. It specifies the state of various internal processor flags at the moment they were last changed. The organization of the context status field is shown below.

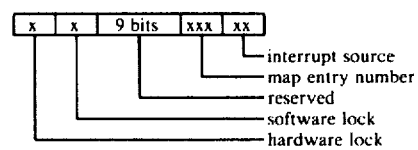

The interpretation of the interrupt source subfield is as follows:

00—block transfer complete
01—function complete
10—fault
11—function loading override The map entry number is simply the binary encoding of the number of the map entry which completed a transfer.

The context locks are used to give one processor or one process exclusive access to the context anytime a change is being made to the context object. When the context is locked by a processor, the second double byte contains the locking processor's identification value. When the context is locked by a process, the second double byte contains the locking process' identification value.

The base-rights field of a context-control-segment access descriptor is interpreted in the same manner as for all objects of base-type access list. The system-rights field of a context-control-segment access descriptor is uninterpreted.

4.2.1.1.1 Mapping Facility Area

The mapping facility consists of eight map entries capable of supporting the random mapping of eight nonoverlapping address subranges from the peripheral sybsystem into corresponding main processor data segments. Two of these map entries (entries 0 and 1) are capable of supporting block transfer as well as random mapping. One map entry (entry 7) and its associated peripheral subsystem address subrange always maps onto the current context-control segment. The two major purposes of this subrange are to capture references to the function-request facility and to allow external processor software to read current status information. When operands are read from this subrange, the processor-resident information is accessed. When data is written into this subrange, it is written through to the context-control segment. Data written into the part of the subrange representing the function request facility is captured when no function is in progress. During function execution, the capture of further function requests is interlocked. As stated above, the copy of processor-resident information in the context-control segment is updated by the processor whenever a significant state to that information occurs (i.e., function completion or block transfer completion).

A copy of the information contained in each processor-resident-map entry is represented within the context-control structure shown in FIG. 2B.

The entry-state field is used to describe the current state of the given map entry. It has the following organization:

is zero, this map entry is not used in address inspection. If the bit is one, this map entry is used in address inspection. The processor-resident copy of this subfield is checked by the mapping facility each time a peripheral subsystem address is received for inspection. Both the map-valid and segment-valid subfields must contain ones for a peripheral subsystem address to be mapped via a map entry.

The 1-bit segment-valid subfield indicates whether or not this map entry currently has a data segment associated with it via the corresponding data segment, segment-descriptor register. A value of zero indicates that no data segment is associated. A value of one indicates that a data segment is associated. The processor-resident copy of this subfield is checked by the mapping facility each time a peripheral subsystem address is received for inspection. Both the map-valid and segment-valid subfields must contain ones for a peripheral subsystem address to be mapped via a map entry. If the segment-valid subfield contains a one and the map-valid subfield contains a zero, a mapping setup error fault occurs.

The 1-bit transfer mode subfield indicates whether this map entry is in random or block transfer mode. A value of zero indicates that this map entry is in random mode. A value of one indicates that this map entry is in block transfer mode.

The 2-bit block transfer state subfield indicates the state of the block transfer whenever a map entry is in block transfer mode. It is encoded as follows:

00—transfer in progress
01—transfer terminated upon count runout
10—transfer termination upon fault
11—transfer termination forced The 1-bit synchronization-mode subfield indicates which synchronization stimulus is to be used during a block data transfer via this map entry. A value of zero indicates that address reception stimulus alone is to be used. This means that the associated external processor can generate a new bus access immediately upon completion of the previous one. Such action can potentially lead to locking up the peripheral subsystem bus when the addressed map entry is not ready for another access cycle. A value of one indicates that REQ/stimulus is to be used. This means that the associated external processor can only generate a new bus access upon receipt of a REQ signal from the map entry to be addressed. By not generating a new bus access until guaranteed of reasonable response time, intermediate bus accesses by other address generators in the peripheral subsystem are allowed.

The 2-bit transfer direction subfield indicates the types of read/write requests which are valid with re-

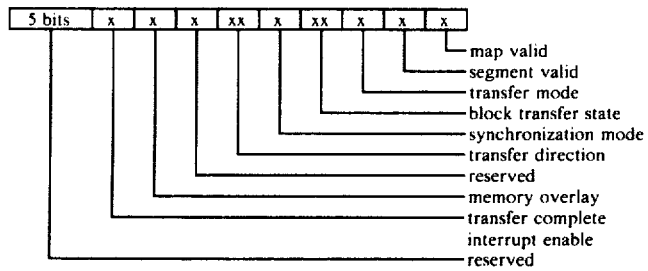

spect to this map entry. Interpretation of the transfer direction subfield is as follows:

00—reading or writing may occur
01—only writing may occur
10—only reading may occur
11—neither reading or writing may occur The 1-bit memory overlay subfield indicates whether or not the peripheral subsystem address subrange associated with this map entry overlays physical memory in the peripheral subsystem. If physical memory is overlaid, whenever an address is mapped via this entry a subsystem bus protocol is employed which prevents that overlaid memory from responding. A value of zero indicates that no memory is overlaid. A value of one indicates that memory is overlaid.

The 1-bit transfer complete interrupt enable subfield indicates whether or not an interrupt is to be generated upon block transfer completion by this map entry. A value of zero indicates that an interrupt is to be generated upon block transfer completion. A value of one indicates that an interrupt is not to be generated upon block transfer completion.

When the segment-valid subfield of the entry state field indicates that a data segment is associated with this map entry, the segment selector field contains the segment selector used to reference the access descriptor for the associated data segment when access to that segment was qualified.

When the transfer mode subfield of the entry state field indicates that this map entry is in block transfer mode, the processor-resident copy of the count field indicates the number of operands remaining to be transferred for transfer termination to occur normally (i.e., upon count runout). Whenever normal transfer termination occurs, both copies of the count field are zero. Whenever normal transfer termination does not occur, both copies of the count field indicate the number of remaining, but not transferred, operands.

When the transfer mode subfield of the entry state field indicates that this map entry is in block transfer mode, the processor-resident copy of the displacement field indicates the displacement into the associated data segment of the next operand to be transferred.

The start-address field is used to specify the starting address of the peripheral subsystem address subrange mapped by this map entry. Subranges are 2n bytes in length with n being in the range zero to sixteen. A subrange of a given power of two in size (say 16 bytes) must appear on an addressing boundary of the same power of two (i.e., a 16-byte boundary). A subrange of 2n bytes in length will thus have a starting address containing at least n trailing zeros. Start addresses are always an integer multiple of an integer power of two (i.e., m*2**n). The n is as described above. The m is any integer such that the above conditions hold and the value of the starting address is limited to the range 0 to 65,535.

The mask field contains a mask which is used to specify the size of the peripheral subsystem address subrange to be mapped by this map entry. The mask is composed of two contiguous bit-string subfields. The higher-order bit string contains all ones. The lower-order bit string contains all zeros. The mapped address subrange is 2** (number of zeros in the lower-order bit string) bytes in length beginning at the starting address.

4.2.1.1.2 Function-Request Facility Area

The function-request facility is the part of the interface processor which accepts function requests and performs the requested function. The function-request facility area of the context-control segment contains a copy of the processor-resident information related to the current or most recent function requested. As shown in FIG. 2B, the area consists of four contiguous parts. The first part is one double byte in length and contains the function state information. The second part is one double byte in length and contains the op-code of the operator requested. The third part is eight bytes in length and contains the operands operated upon in performing the requested function. The fourth part is eight bytes in length and is used to record the result of the requested function. The organization of the function state field is shown below.

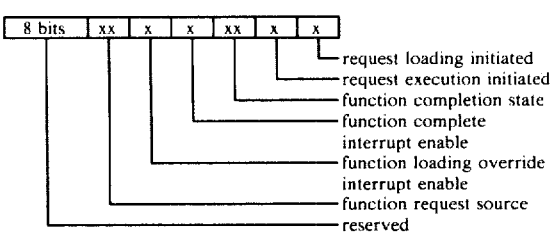

The interpretation of the function completion state subfield is as follows:

00—function in progress
01—function completed normally
10—function completed faulted
11—reserved The function complete interrupt enable subfield indicates whether or not an interrupt is to be generated upon function completion. A value of zero indicates than an interrupt is to be generated upon function completion. A value of one indicates that an interrupt is not to be generated upon function completion.

The function loading override interrupt enable subfield indicates whether or not an interrupt is to be generated upon function-loading override. A value of zero indicates that an interrupt is to be generated upon function-loading override. A value of one indicates that an interrupt is not to be generated upon function-loading override.

The interpretation of the function request source subfield is as follows:

00—function requested via the function-request facility
01—function requested via interprocessor communication
10—function requested via alarm
11—reserved

4.2.1.1.3 Fault Information Area

To assist in the diagnosis of a fault, fault information is recorded in the context-control segment. At the occurrence of a fault, a processor automatically places information in this area that defines the type and circumstances surrounding the fault. The appropriate fault handler may use it to undertake repairs. Only those fields needed to record data specific to the given fault are valid upon entry to the fault handler. Which fields are valid under which circumstances is discussed in section 5. Diagrammatically, the fault-information area of a context-control segment appears as shown in FIG. 2B.

The fault-state field is used to describe the current or most recent fault state. It has the following organization.

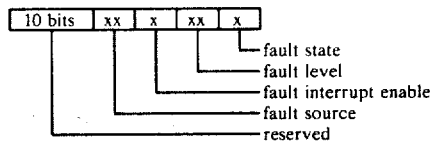
- fault state
- fault level
- fault interrupt enable
- fault source
- reserved The fault-state flag specifies whether or not the context is in faulted state. A value of zero indicates that the context is not in faulted state. A value of one indicates that the context is in faulted state.

The fault-level subfield indicates whether the fault which has occurred is context-level, process-level, or processor-level. The fault handler requires this information in order to know where the fault information has been stored.

Whenever a fault occurs within a context, a fault interrupt can be generated causing control within the external processor to flow from the current instruction stream to an instruction stream called the fault handler. Any repair action possible may be programmed into this handler. The fault-interrupt-enable subfield indicates whether or not an interrupt is to be generated upon occurrence of a fault. A value of zero indicates that an interrupt is to be generated upon occurrence of a fault. A value of one indicates that an interrupt is not to be generated upon occurrence of a fault.

The interpretation of the fault-source subfield is as follows:
- 00—fault originated in ampping facility
- 01—fault originated in function-request facility
- 10 to 11—reserved The fault code word is used to record the cause of a fault (e.g., a segment-displacement fault).

The fault-segment selector is used to record a segment selector for a segment which caused a fault. The fault displacement is used to record the displacement which caused a fault or access-descriptor segment selector which caused a fault.

4.3 PROCESSES

Logically, a process is simply an environment in which execution by a processor can occur. When the execution of a process occurs, it does so at a particular site or point within the associated environment. In a combined external-processor/interface-processor system, that point is defined, at any instant, by a specific instruction within a specific external processor instruction stream. The additional environment provided by the interface processor, extends that of the external process to be logically within a specific context, within a specific domain within the main processor address space. The execution point moves, of course, as each instruction is executed because a new instruction is automatically specified. Occasionally, as the result of instruction execution, a new instruction stream within the external processor software is specified. Unless the process should indicate its termination, the execution point continues to move in this manner forever. There is thus a close and long-term association between the environment provided by an interface processor and a particular set of external processor software. With interface processors, there are no concepts of service period or involuntary process suspension. Interface processes operate under "run-to-completion" scheduling.

4.3.1 Process Objects

Provided there is some means for recording the coordinates of any particular execution point, a processor may suspend the execution of a process whenever necessary. When the execution of a process is suspended, its context object already records most of the information needed to resume its execution. The only piece of information it does not record is the identity of the context object currently in use by the process. That information is recorded in another hardware-recognized data structure, called a process object. Since there is no concept of intercontext control flow with interface processors, this information is constant. Thus, in the event the process is suspended, no further information need be saved.

In addition to the current context object information, a process object, 140 (FIG. 2A) contains descriptors for several other objects related to a process. Generally, these objects are not accessible to the process, but are instead used by hardware and system software for process maintenance and control.

The base rights field of a process object access descriptor is interpreted in the same manner as for all objects of base-type access list. The system-rights field of a process object access descriptor is uninterpreted.

The objects referenced by a process object are functionally described in the following subsections. In those cases where the referenced object is uniquely associated with process objects (i.e., actually part of their basic structure), the structure of the object as well as its function is described.

4.3.1.1 Process-Control Segments

The process-control segment, 150 (FIG. 2A), accessible via the first entry in a process object, contains fields for recording both process state and fault information.

The first double byte in the process-control segment contains process-status information that is otherwise not found in any of the segments associated with a process. In particular, it specifies the state of certain internal processor flags at the moment execution of the process last ceased. Finally, it contains the state of the process itself, such as whether it is running or waiting for a processor. The organization of the process status field is shown below.

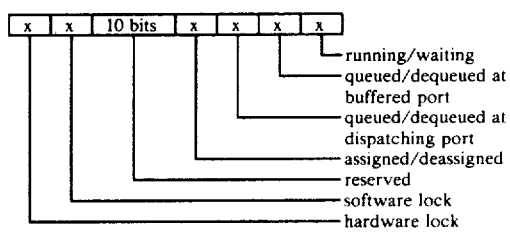
- running/waiting
- queued/dequeued at buffered port
- queued/dequeued at dispatching port
- assigned/deassigned
- reserved
- software lock
- hardware lock The running/waiting bit is interpreted as follows:
- 0—running
- 1—waiting The queued/dequeued at a buffered port bit is interpreted as follows:
- 0—not queued at a buffered port
- 1—queued at a buffered port The queued/dequeued at a dispatching port bit is interpreted as follows:
0—not queued at a dispatching port
1—queued at a dispatching port
The assigned/deassigned bit is interpreted as follows:
0—assigned to a process
1—not assigned to a process The process locks are used to give one processor or one process exclusive access to the process anytime a change is being made to the process object. When the process is locked by a processor, the second double byte contains the locking processor's identification value. When the process is locked by a process, the second double byte contains the locking process's identification value.

Also contained in the process control segment are two identification numbers. The first of these, called the process ID may be read by a process at any time in order to establish its own identity within a module of a system's resource management software. Similarly, the principal ID may be read by a process at any time to establish the identity of the agent or agency responsible for its creation. Normally, this will be an agent authorized to share the system's resources.

When a process-level fault occurs, fault information is recorded in the process-control segment. The fault code word is used to record the cause of a fault. The director index is used to record the index into the current segment table directory of the segment table with which a fault is associated. The segment index is used to record the index into that table of the segment descriptor for the segment that caused a fault.

The base rights field of a process control segment access descriptor is interpreted in the same manner as for all objects of base-type data segment. The system-rights field of a process-control segment access descriptor is uninterpreted.

4.3.1.2 Current Service and Buffered Ports

In certain situations, it is essential for hardware to record for later use by both hardware and software, the identity of the last port used for process service. This information is found in the third entry of its process object and is updated each time an access descriptor for the process is sent to a service port. In most cases, the current service port is simply the dispatching port last used to pair the process with a processor. Occasionally, it is a buffered port for a software service process such as resource manager.

For similar reasons, the hardware also records the identity of the last buffered port used to pair the process with a message. This information is found in the fourth entry of its process object and is updated each time the process receives a message via a buffered port or an access descriptor for the process object is enqueued at a buffered port.

4.3.1.3 Fault-Buffered Ports

Whenever a process commits a fault which cannot be handled within the current context, the process is suspended, fault information is recorded in its process-control segment, and the process is sent as a message to a maintenance process for repair or destruction. The port at which such a maintenance process waits to receive broken processes is called a fault-buffered port.

4.3.1.4 Fault-Access Descriptor

Whenever a process-level, nonrestartable, communication instruction fault occurs, the access descriptor for the message which could not be delivered is recorded in the current-process object.

4.3.2 Buffered Communication Ports

Interface-processor processes communicate with other processes by sending and receiving messages, in the form of access descriptors, at system objects called buffered communication ports. These buffered ports are the same in form and function as those described in section 4.7.2 of the above-identified Colley et al patent application.

4.4 PROCESSORS

An interface processor consists of two cooperating processing elements: a mapping facility and function-request facility. The mapping facility translates peripheral subsystem addresses into main processor system addresses. The function-request facility executes the operator set described in section 7. The mapping facility and the function-request facility can run in parallel. The only area of interference is in generating references into the main processor system. In cases of such interference, the mapping facility has priority except where there is an indivisibility requirement over multiple function-Request facility references.

4.4.1 Processor Objects

As with other processors, interface processors use a hardware-recognized data structure called a processor object to contain processor specific state and access information. This object is represented by a segment of base-type access list with the organization shown in FIG. 2B, block 142.

Within interface processor objects, all the access descriptors serve the same purpose and are treated the same way as those for the corresponding entries within processor objects for other types of processors. While serving a similar purpose to processor-control segments for other processor types, interface processor-control segments, 170, differ in some respects and are described below.

The base-rights field of a processor object access descriptor is interpreted in the same manner as for all objects of base-type access list. The system-rights field of a processor object access descriptor is interpreted as follows:

00—an interprocessor message may be broadcast via the global communication segment of this processor object, or it may be sent to this processor via the processor-control segment of this processor object.
01—an interprocessor message may be broadcast via the global communication segment of this processor object.
10—an interprocessor message may be sent to this processor via the processor-control segment of this processor object.
11—no interprocessor messages may be sent to this processor object.

These two types of interprocessor communication are described in the following two subsections.

4.4.1.1 Processor Control Segments

A processor is able to receive information directed to it from other processors by inspecting, when requested, the contents of an area called the local communication area, 172, in its processor-control segment, 170 (FIG. 2B). This segment, which is unique to each processor, is accessed via the first access descriptor in its processor object. In addition to interprocessor communication, the segment is also used to record fault and diagnostic scan information.

In order to interlock the transmission of multiple, simultaneous interprocessor messages, each processor-control segment contains a set of lock bits in its first double byte. The format of this lock field is shown below.

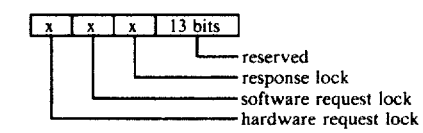

The request locks and the response lock must be clear before transmission begins. At the onset of communication, one of the request locks and the response lock are set. Following the communication, the request lock is cleared, with the response lock left set until the processor carries out the functions requested by the message.

When the port is locked by a processor, the second double byte contains the locking processor's identification value. When the port is locked by a process, the second double byte contains the locking process's identification value.

The base-rights field of a processor control-segment access descriptor is interpreted in the same manner as for all segments of base-type data segment. The system-rights field of a processor-control segment access descriptor is uninterpreted.

4.4.1.1.1 Interprocessor Messages

An interprocessor message takes the form of a word-length, bit field containing a set of processor-control flags. The semantics of these control flags and the processor response under varied conditions is presented in section 5. Interprocessor messages have two components: a general component and a processor-type specific component. The general component is stored in the third double byte of the segment by the sending processor. It has the following organization.

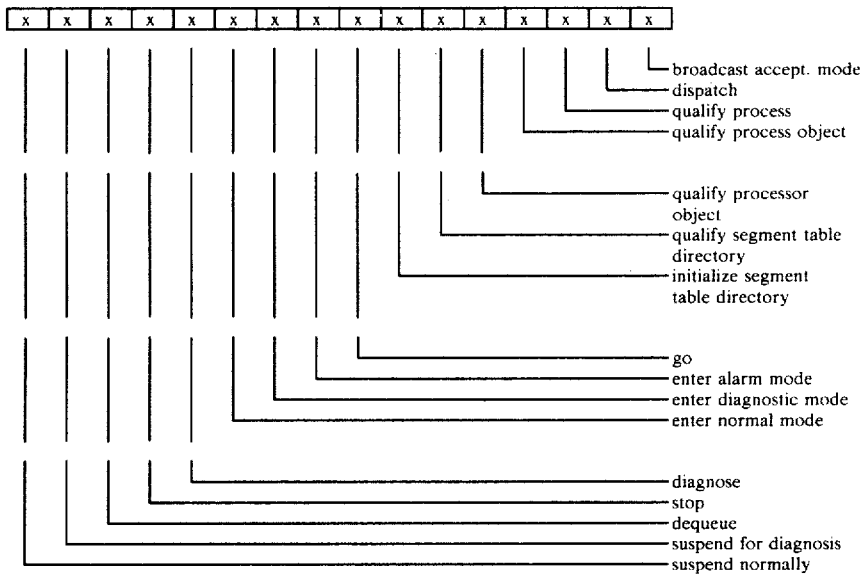

The processor-type specific component is stored in the fourth double byte of the segment by the sending processor. It has the following organization

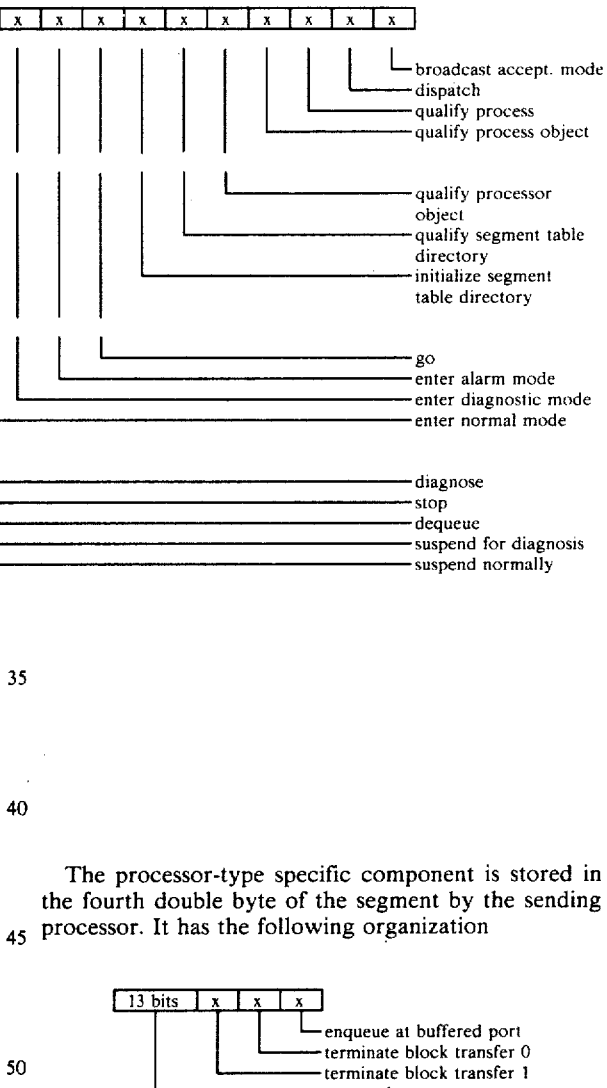

The processor-count and response-count fields also participate in the message interlock function. At the time a message is sent, the sending processor initializes the response count to the processor count value. When the processor completes the requested function, it decrements the response count and tests the new value for zero. If the decremented value is zero, the processor clears the response lock. Normally, the processor count value in a processor-control segment will be initialized to one.

Another double byte bit field is present in each processor-control segment. This field contains status information about the associated processor. Included in the processor status field, as shown below, are subfields describing the processor state, dispatching state, and type.

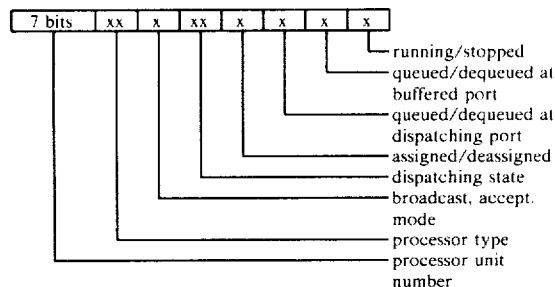

The processor unit number is the value loaded into the processor at initialization or reset.

The running/stopped bit is interpreted as follows:
0—running
1—stopped

The queued/dequeued at a buffered port bit is interpreted as follows:
0—not queued at a buffered port
1—queued at a buffered port The queued/dequeued at a dispatching port bit is interpreted as follows:
0—not queued at a dispatching port
1—queued at a dispatching port The assigned/deassigned bit is interpreted as follows:
0—assigned to a process
1—not assigned to a process.

The dispatching state subfield is interpreted as follows:
00—using normal dispatching port
01—using alarm dispatching port
10—reserved
11—fatal error.

The meaning of these states is explained in later sections of this section and in section 5.

The broadcast acceptance mode bit is interpreted as follows:
0—broadcast interprocessor messages are being accepted and acknowledged
1—broadcast interprocessor messages are not being accepted or acknowledged.

The processor-type subfield is interpreted in the following manner:
00—generalized data processor
01—interface processor
10—reserved
11—reserved.

All of the subfields in the processor status field are initialized and maintained by the processors themselves.

4.4.1.1.2 Processor Fault Information

When a processor-level fault occurs, fault information is recorded in the processor-control segment (FIG. 2B). The processor fault code word is used to record the cause of the processor-level fault. The process fault code word, the segment table directory index, and the segment table index are used to record the same information that would have been recorded in the process object when that is not possible.

The diagnostic scan area is used to record information requested via the diagnose function of interprocessor communications.

4.4.2 Dispatching Ports

Interface processors serve processes that are ready for execution by receiving them at dispatching ports in much the same manner as processes serve messages that have been sent to them at buffered communication ports. These dispatching ports are similar in form and function as those described in section 4.8.2 of the above-identified Colley et al application. The differences are all related to the fact that deadlines are not employed by interface processors. Interface processes are normally served by interface processors in a "run to completion" fashion. In many cases, only on interface process, dispatched at system initialization time, will be associated with a given interface processor. Thus, the deadline and preemption related information is not used in dispatching ports employed by interface processors.

4.4.2.1 Alarm Dispatching Ports

Upon the detection of hardwired alarm signal, a processor will suspend any process that it may currently be executing and enter the alarm dispatching state. At that point it will begin executing any process it finds queued at the alarm dispatching port specified by the port access descriptor in its processor object. Processes present at this port are intended to be of extreme priority, such as those that might run in the event of an imminent power failure.

Interprocessor messages can be used to request a processor to either enter or exit the alarm dispatching state.

4.4.2.2 Fault-Buffered Ports

Whenever a processor commits a fault which cannot be handled within the current process, the processor is stopped, fault information is recorded in its processor-control segment, and the processor is sent as a message to a maintenance process for repair or destruction. The port at which such a maintenance process waits to receive broken processors is called a fault-buffered port.

Since the processor is stopped and does not dispatch any new process, the current process entry records an access descriptor for the process being served when the fault occurred. This obviates the need for a fault process entry.

4.4.2.3 Fault-Access Descriptors

The fault-access descriptor is to record the access descriptor which would normally be recorded in the like-named entry in the process object for the process which faulted when it is impossible to record it there.

4.5 STORAGE RESOURCES, TRANSFORMERS, AND LABELS

Storage resources, transformers, and/or labels are supported by the same mechanisms and data structures as used by the same mechanisms and data structures as used by other processors.

4.6 PROCESS REGISTERS

To efficiently access the system objects previously described in this section, each processor possesses an extensive set of internal, segment-descriptor registers. These registers are used to buffer segment address and length information obtained from segment descriptors.

The first set of registers, which are referenced directly by the microcode, is shown below:

| 15 | 0 | 23 | 16 | 2 | |
|---|---|---|---|---|---|
| length | | base | | | 0 segment table directory |
| " | | " | | | 1 segment table |
| " | | " | | | 2 processor control segment |
| " | | " | | | 3 processor object |
| " | | " | | | 4 process control segment |
| " | | " | | | 5 process object |
| " | | " | | | 6 context control segment |
| " | | " | | | 7 context object |
| " | | " | | | 8 public access list |
| " | | " | | | 9 private access list |
| " | | " | | | 10 entry access list |
| " | | " | | | 11 segment work register - A |
| " | | " | | | 12 segment work register - B |
| " | | " | | | 13 segment work register - C |
| " | | " | | | 14 segment work register - D |

The second set of registers, which are referenced directly via the mapping facility based upon the current map entry to segment bindings, is shown below:

| 15 | 0 | 23 | 16 | 2 | |
|---|---|---|---|---|---|
| length | | base | | | 0 data segment - A |
| " | | " | | | 1 data segment - B |
| " | | " | | | 2 data segment - C |
| " | | " | | | 3 data segment - D |
| " | | " | | | 4 data segment - E |
| " | | " | | | 5 data segment - F |
| " | | " | | | 6 data segment - G |
| " | | " | | | 7 data segment - H |

Since the segment-descriptor registers can only contain segment information that is identical to that found in memory, it is never necessary to save or store their contents. Furthermore, they are only reloaded when conditions demand it for proper and efficient operation. These conditions are described in the following table:

| REGISTER | LOAD TIME |
|---|---|
| 0 - segment table dir. | initialization; reset |
| 1 - segment table | first reference to segment table |
| 2 - processor control seg | initialization; reset |
| 3 - processor object | initialization; reset |
| 4 - process control seg. | process switch |
| 5 - process object | process switch |
| 6 - context control seg. | process switch |
| 7 - context object | process switch |
| 8 - public access list | process switch |
| 9 - private access list | process switch |
| 10 - entry access list | access list entry |
| 11 - segment work reg. - A | when needed |
| 12 - segment work reg. - B | when needed |
| 13 - segment work reg. - C | when needed |
| 14 - segment work reg. - D | when needed |
| 0 - data segment A | selection of data segment |
| 1 - data segment B | selection of data segment |
| 2 - data segment C | selection of data segment |
| 3 - data segment D | selection of data segment |
| 4 - data segment E | selection of data segment |
| 5 - data segment F | selection of data segment |
| 6 - data segment G | selection of data segment |
| 7 - data segment H | selection of data segment |

The data segment, segment-descriptor registers are loaded automatically whenever a new data segment is selected to be bound to the corresponding entry in the mapping facility. Once loaded, they are selected directly through the correspondence with that mapping facility entry.

Interface processors also possess a set of registers for maintaining the status of the currently executing process and context, as well as the status of the processor itself.

| 15 | 0 | |
|---|---|---|
| context status | | 0 context status registers |
| process status | | 1 process status register |
| prcssr. status | | 2 processor status register |

5.0 INTERFACE-PROCESSOR FACILITIES

Generalized Data Processors (GDP) and Input/Output Processors (IOP) provide a set of nonprimitive, object-based facilities. The interface processor not only provides those basic facilities, but also provides other facilities specific to its specialized function of supporting the interfacing of peripheral subsystem to the main processing system. Descriptions of the basic access environment manipulation and communication facilities available on interface processors can be found in section 5 of the above-identified Colley et al patent application. Discussions of exception handling, debugging, low-level initialization, system initialization and reset, and alarm handling are also found in sections at the end of that section. In this section, the only facilities described are those which are either unique to interface processors or different but logically similar to those employed by other processors. Unless otherwise specified, all those facilities described in the above-identified Colley et al patent application are available on interface processors.

5.1 PERIPHERAL SUBSYSTEM ADDRESS-MAPPING MECHANISMS

The peripheral subsystem address-mapping mechanism makes available, via given address subranges within the peripheral subsystem address space, access to data segments which reside in the main processor address space. When an address within one of these address subranges appears on the peripheral subsystem bus, the interface processor responds as would a memory device or subsystem on the same bus.

From zero to eight such subranges can be mapped at any given time. Subranges are $2^{}n$ bytes in length with n being in the range zero to sixteen. That is, subranges of sizes 16 bytes or 32 bytes are supported whereas subranges of sizes 15 bytes or 33 bytes are not supported. Note that a subrange of a given power of two in size (say 16 bytes) must appear on an addressing boundary of the same power of two (i.e., a 16-byte boundary). A subrange of $2^{}n$ bytes in length will thus have a starting address containing at least n trailing zeros.

When a peripheral subsystem address is recognized as being mapped by one of the map entries, that address contains some displacement from the starting address of the given subrange. That subrange displacement is used directly as the operand displacement into the corresponding data segment.

In many cases the subrange and the corresponding data segment will be of equal length. If the subrange is longer than the corresponding data segment, the mapping of an address into the part of the subrange for which the corresponding data segment displacement is invalid results in a displacement fault. If the subrange is shorter than the corresponding data segment, then those valid data segment displacements beyond the length of the subrange cannot be generated. This effectively leaves that part of the data segment inaccessible through the map.

In most cases, the rights required for the associated data segment by the transfer direction information in effect for a subrange will be just those base rights which are available for that segment (i.e., only read rights required with both read-and-write rights being available). The two map manipulation operators, discussed below and described in section 7, ensure that this condition holds for any active map entry and associated data segment, segment-descriptor register.

The address subranges recognized by an interface processor can vary over time and under software control. Changes to address subrange mappings will probably occur relatively infrequently. For example, such a change would probably occur at the time a peripheral subsystem is reconfigured. The ALTER MAP operator, available via the function-request mechanism, is used to change address subrange mappings.

The bindings between the address subranges and the corresponding data segments can also vary over time and also under software control. Such binding changes will probably occur more often than changes to address subrange mappings. For example, such a change could be used to select among several input/output buffers. The SELECT DATA SEGMENT operator, available via the function-request mechanism, is used to change segment to subrange bindings. Note that when the mapping information and the data segment selection information associated with a given map entry must both be changed, the mapping information must be changed first. Subsequent selection of another data segment to be associated with that map entry need not alter the mapping information.

5.2 COMPATIBILITY MECHANISMS

The interface processor provides additional operators, beyond those available on the external processor, to allow software running on that processor to deal with the part of its environment provided within the main processor system. For example, the peripheral subsystem address-mapping mechanism only provides access to objects of base-type data segment. Access to and manipulation of objects of base-type access list is supported via the additional operators provided by the interface processor. One can consider the total operator set available to software in the peripheral subsystem to be provided by two processor components: the external processor and the interface processor.

5.2.1 Request Protocol

The interface processor supports requests for the execution of these operators via its function-request facility. This function-request mechanism appears to software in the peripheral subsystem as a memory-mapped peripheral interface consisting of a set of command/data/status registers. It has three states: inactive, with a function-request being loaded, or with a function being executed. When it is inactive, external processor software, an interprocessor communication, or an alarm occurrence can change its state to "request loading initiated" by setting the appropriate bit in the function state field. While in the request loading state, an interprocessor communication or an alarm occurrence can override request loading. If a function loading override occurs and the associated interrupt is enabled, a peripheral subsystem interrupt is generated to inform the associated external processor software. The execution of a function is initiated by setting the appropriate bit in the function state field. Once the function-request facility begins the execution of a function, further function requests from any source are interlocked until that function completes and the associated completion status has been read. The function-request facility then reenters the inactive state.

For reliablity and fault-recovery purposes, the contents of these command/data/status registers are reflected in the current context-control segment, as described in section 4.

There are two types of operators available via the function-request mechanism: environment manipulation operators and communication operators.

5.2.2 Environment Manipulation

Except for the label movement and comparison operators and the object-interlocking operators, the full complement of those environment manipulation operators available on generalized data processors is made available to external processor software by an interface processor.

5.2.3 Communication

Lacking the concept of a sequential instruction stream, interface processors need not provide any support for intra-context control flow. Interface processors, therefore, have no such operators. Interface processors do, however, support process-to-process and processor-to-processor communication as described below.

5.2.3.1 Process-to-Process Communication

There are only two major differences in communication at the process level. The first is the removal of the simple unbounded WAIT TO RECEIVE operator. No facility is lost since basically the same functionality is still available in bounded form via the WAIT TO RECEIVE OR n TIME QUANTA operator. By not providing any operators with unbounded execution times, the interface processor avoids having to provide any forced function termination mechanism or suffer from its potential misuse. The second difference is the removal of the WAIT n TIME QUANTA operator and its replacement by the SIGNAL AFTER n TIME QUANTA operator. In many cases the WAIT TO RECEIVE OR n TIME QUANTA operator will be used in situations where there is a known expected delay period which must elapse before the process can profitably continue execution. For example, this will be true in cases where the next request for service is expected to come from within the main processor system. However, when the next service requirement is expected to come from within the peripheral subsystem, a programmable timer can be quite useful. Such a timer can be used to drive a status sampling peripheral program or to provide an upper bound upon response time. For example, with some very slow speed peripherals using status-driven synchronization, it is known that if the peripheral status is sampled every n milliseconds (i.e., usually something like twice the maximum potential data rate of the peripheral) no data will be lost. With such long periods of inactivity, it makes sense to issue a signal request and make the processor available for other purposes.

5.2.3.2 Processor-to-Processor Communication

The only major difference in communication at the processor level is the addition of the processor-type specific communication facility. This is an extension of the general interprocessor communication facility already specified. It supports functions specific to a processor type. The interprocessor message is extended by a double byte to be 32 bits in length. The second double byte is used for type-specific messages. General messages are used with global interprocessor communication. Combination-general and type-specific messages are used with local interprocessor communication. There are three interface control functions that can be specified in an interprocessor communication segment.

ENQUEUE

The reaction to the ENQUEUE flag by an interface processor in the dequeued state is to enqueue itself as a message at its fault-buffered port. ENQUEUE implies STOP after enqueuing is complete. For an interface processor which is not currently dequeued, no response is required. With interface processors already in the enqueued state, no response is required.

TERMINATE TRANSFER 0

The reaction to the TERMINATE TRANSFER 0 flag by a processor on which map entry 0 is in block transfer mode with a transfer in progress is to terminate that transfer, flush the internal transfer buffer (if not empty), and change the associated block transfer state to "transfer termination forced." For an interface processor with no block transfer in progress via map entry 0, no response is required.

TERMINATE TRANSFER 1

The reaction to the TERMINATE TRANSFER 1 flag by an interface processor on which map entry 1 is in block transfer mode with a transfer-in-progress is to terminate that transfer, flush the internal transfer buffer (if not empty), and change the associated block transfer state to "transfer termination forced." For an interface processor with no block transfer in progress via map entry 1, no response is required.

Note that ENTER DIAGNOSTIC STATE function requests in general messages are ignored by interface processors.

As with all requested functions performed by interface processors, upon completion of an interprocessor communication response phase, if enabled, a function complete interrupt is generated after appropriate processor-resident status information has been updated.

5.2.4 A Typical Transfer Cycle

The following simple example describes a typical transfer cycle in terms of both control flow and data flow within both the main processor system and an associated peripheral subsystem.

A typical transfer cycle begins by a process, executing on a generalized data processor, coming to the point where it needs some data transferred from an input device to main memory or from main memory to an output device. At such a point, it sends a service-request message via an agreed-upon buffered port to a process resident on the external processor that can perform the needed transfer.

In this example, let us assume that the external processor software is divided into two parts. The first part, using the compatibility mechanisms available via the function-request facility of the associated interface processor, monitors and controls that processor. The second part provides one or more peripheral drivers (each with potentially no knowledge of the presence of the associated interface processor). When a peripheral driver is not actively engaged in performing a data transfer, control within the peripheral subsystem software resides in the interface processor monitoring software. When this monitoring software decides that the peripheral subsystem needs further work to do, it attempts to receive a service-request message from software in the main processor system. It does this by requesting that the interface processor execute one of its message reception operators (i.e., CONDITIONAL RECEIVE).

The monitoring software detects the completion of the requested function either via interrupt or status driven methods. When a service-request message is received, the monitoring software must first decide which of several potential peripheral drivers should be initiated. After performing any necessary map entry setup and/or main processor environment manipulation via interface processor functions, the monitoring software transfers control to the appropriate peripheral driver and passes any required parameters.

That peripheral driver then performs the requested data transfer in accordance with the transmitted parameters. Upon completion of the transfer, the peripheral driver returns control to the monitoring software passing back the appropriate status information.

The monitoring software then formulates a return message for the requesting GDP process. Using one of the message-transmittal operators provided by the interface processor (i.e., CONDITIONAL SEND), the monitoring software sends the return message via an agreed-upon buffered port to the requesting process. Having completed one transfer cycle, the monitoring software then finds itself in the same position that it was in at the beginning of this example: attempting to receive another service-request message and enter a new cycle.

5.3 EXCEPTION HANDLING

Various conditions may arise during normal processing which require exceptional software treatment. Considered broadly, these may either be events of which software must be made aware but which do not preclude continued processing or they may be events which require immediate software attention. The former class of events are handled via the notification mechanism; the latter via one of the fault mechanisms.

The fault mechanisms can be further subdivided into three levels. When a condition arises which prohibits normal processing to continue, either a context-level, process-level, or processor-level fault occurs. The level of the fault indicates the processing object which can no longer proceed normally. A context-level fault indicates that normal processing within the current context must be suspended, but that the situation can be handled within the process. A process-level fault indicates that normal processing of the entire current process must be suspended. A processor-level fault indicates that the normal processing of processes by the processor must be stopped and a special process executed. Each class of faults is dealt with at a level appropriate to its severity. If none of these fault levels can properly deal with the problem, then the processor will perform a consistency halt.

5.3.1 Notification

A notification is treated as an implicit SEND of an access descriptor to a process-designated port. Whenever the access descriptor count associated with an object would go to zero as the result of some normal processor activity, a notification occurs. Rather than destroying the descriptor and reducing the count, it is sent to the port designated as the notification port in the process object. If this SEND cannot complete successfully, a process-level fault occurs as described below under communication instruction faults.

5.3.2 Fault Mechanism Data Structures

There are fault recording areas associated with each level at which faults may occur. For each context, the context-control segment contains an 8-byte long data area for context-level fault information. For each process, the process control segment contains an 8-byte long data area for process-level fault information. It also has a reserved access descriptor entry for recording a fault-access descriptor if necessary. For each processor, the processor-control segment contains a 12-byte-long data area for processor-level fault information. It also has two reserved access-descriptor entries.

Each of the fault information areas has a fixed format which defines fields for any information which may ever be stored by a fault at that level. Which fields actually contain valid information after a fault is defined in the discussions of the various faults.

5.3.3 Context-Level Faults

Context-level faults require interruption of normal processing within the running context. When such a fault occurs, information identifying its cause is recorded in the context-control segment and, if enabled, a fault interrupt is generated to the associated peripheral subsystem. The state of the context is also set to faulted which causes special treatment of further context-level faults (see below). As described in section 4, the fields defined in the context fault information area are:
1. the context fault code;
2. the fault-segment selector; and
3. the fault displacement.

For any context-level fault, the first of these fields is always valid.

5.3.3.1 Object-Access Faults

All uses of access descriptors to actually make use of an object require some checking of the type of the object; in addition, it may be necessary to check the rights associated with the descriptor. If these checks do not result in a decision to permit the instruction to proceed, then an object-type fault or object-rights fault is generated. The one additional valid field is:
1. the fault-segment selector.

5.3.3.2 Displacement Faults

References to a segment must be within the extent of that segment as defined by the segment length. If a reference specifies an offset greater than the length, a displacement fault occurs. Additional valid fields are:
1. the fault-segment selector; and
2. the fault displacement.

5.3.3.3 Descriptor-Control Faults

Operations upon access descriptors directly (as opposed to operations upon the objects they reference) may require the checking of the associated descriptor control flags. If this check does not result in a decision to permit the instruction to proceed, then either a descriptor control fault or an indirect descriptor control fault is generated. The one additonal valid field is:
1. the fault-segment selector.

5.3.3.4 Interlock Failure Faults

When an attempt is made to execute an operator that requires exclusive access to a system object, the process must lock the object. If this cannot be accomplished, a fault will be generated. The one additional valid field is:
1. the fault-segment selector.

5.3.4 Process-Level Faults

Process-level faults require the suspension of the concerned process and repair by a fault-handling process. When such a fault occurs, the processor is preempted from the currently running process and information about the fault is recorded in the process object fault areas. The preempted process object is sent as a message to the fault service port identified in its process object. The processor then attempts dispatching at its current dispatching port. The limited number of process-level faults which can occur are described below.

As described in section 4, the fields defined in the process fault areas are:
1. the process fault code;
2. the directory index;
3. the segment index; and
4. the fault-access descriptor.

For any process-level fault, the first of these fields is always valid.

5.3.4.1 Reference Validity Faults

When an attempt is made to reference the contents of any segment, the valid flags of its segment descriptor and of the segment descriptor for the segment table containing its segment descriptor are inspected. If the latter of these is invalid, a segment table-directory fault occurs; if the former is invalid, a segment table-fault occurs with one exception noted below. Additional valid fields are:
1. the directory index; and
2. the segment index.

5.3.4.2 Context-Fault-Failure Faults

While a context fault is being handled (i.e., the context-fault state is faulted), the occurrence of an additional context-level fault is considered to be an error. If one occurs, a process-level context-fault handler-failure fault is generated.

If a context fault occurs in normal mode, its correct reporting requires the existence of and correct access to a fault information area in the context-control segment. If this condition is not met, then the context-level fault cannot be successfully generated. In this case, a process-level context fault mechanism failure fault is generated.

5.3.4.3 Segment Descriptor Allocation Faults

When one of the segment creation operators is being executed and the segment-descriptor list of the specified segment table contains no free segment descriptors, a segment-descriptor allocation fault occurs. If this occurs during either the execution of either a CREATE DATA SEGMENT or CREATE ACCESS LIST operator, it is treated as a restartable fault.

5.3.4.4 Nonrestartable Faults

There are two major cases in which process-level faults yield situations in which the instruction which was executing at the time of the fault cannot simply be restarted after some repair action. These cases are due to the fact that system objects have been irrecoverably altered before the fault is detected.

5.3.4.4.1 Communication-Instruction Faults

During the execution of a logical SEND operation, failures which occur cannot in general be guaranteed not to already have altered memory structures. As a result all faults which occur after the initiation of an actual SEND function (as opposed to during any initial instruction set-up) are treated as nonrestartable faults. A SEND may fail to complete due to an overflow of a queue at a target port, invalidity of part of a port object, or data structure errors at a port. The fault code distinguishes these cases. When this occurs, the message and message target are recorded so that software can continue the operation to completion. The message-access descriptor is stored in the fault-access descriptor. As this always represents a move of the descriptor, no count alteration is necessary (reclamation marking is required). The store is done without regard to the previous contents of the fault-access descriptor entry. It is up to the software to ensure that this entry contains a null entry at any time such a fault may occur. The segment indices of the target port are also stored. Thus all the additional fields are valid.

Note that a SEND fault can occur when no process is associated with the processor. Specifically, process suspension involves SEND(s) of the current running process, during which time no other process is associated with the processor. These faults are handled exactly as above except that they cause processor-level faults as described below under "Faults without A Process."

5.3.4.4.2 Storate-Allocation Faults

When one of the segment-creation operators is being executed and none of the storage-block descriptors in the specified storage resource contain enough storage to satisfy the request, a storage-allocation fault occurs. This is treated as a nonrestartable fault. In such cases, an access descriptor for the previously allocated segment descriptor is stored in the specified destination. The segment descriptor is marked as valid but with no storage associated and has its length field set to the requested length minus one.

5.3.5 Processor-Level Faults

The most severe disruption of processing is a processor-level fault. These require the suspension of the running process and the normal dispatching mechanism for the processor, and the sending of that processor, via a special buffered port, to a special process for evaluation and possible repair. As described in section 4, the fields defined in the processor fault areas are:
1. the processor-fault code;
2. the fault-access descriptor;
3. the process-fault code;
4. the process-directory index;
5. the process-segment index; and
6. the fault-process, object-access descriptor.

For any processor-level fault, the first two of these fields are always valid.

When such a fault occurs, the processor is preempted from the currently running process, and the access descriptor for that process is moved within the processor object to the fault-access descriptor. Since the access descriptor is moved, it requires no alteration to its access-descriptor count (reclamation marking is required). The previous contents of the fault access-descriptor entry are overwritten without count updating or concern for its descriptor control settings. It is up to the software to guarantee that this entry is null whenever such a fault may occur if corruption of the access descriptor count is to be avoided. This approach is taken because the potential faults associated with descriptor movement cannot be tolerated at this level in the fault hierarchy. Information about the fault is recorded in the processor fault information area, and the preempted processor object is sent as a message to the fault service port identified in its processor object.

This operation may logically be viewed as the processor sending an interprocessor message to itself of: SUSPEND FOR DIAGNOSIS, and ENQUEUE.

5.3.5.1 Process-Level Fault Failure Faults

The correct handling of a process-level fault requires that space be available at the fault communication port to enqueue the faulted process. It also requires that proper descriptors for a fault information reporting area and a fault communication port be available. If any of these conditions is not met, then a process-level fault mechanism failure occurs.

In the first case, where the fault information can be properly recorded but there is no available queueing space at the port, the process-level fault information is recorded normally. A processor-level fault is then generated with a fault code which indicates that the fault port overflowed.

In the second case, where fault information cannot be properly recorded, the information is stored in the "process" fields of the processor-fault area instead. The processor-level fault code indicates a process-level fault-information recording fault. The process-fault code is valid in this case. Also valid are any of the "process" fields corresponding to fields in the process-level fault areas which would have been valid for the fault.

5.3.5.2 Faults without a Process

It is possible for a fault to occur while no process is assigned to the processor. These can only occur due to functions which can be requested via the interprocessor-communication mechanism (although the interprocessor communication mechanism need not have been used to cause the instance of the function which faulted). For such faults, a null access descriptor is stored in the fault access-descriptor field.

If the fault corresponds exactly to a process-level (e.g., SEND port overflow fault), then it is handled in a manner analogous to a process-level fault information recording fault. That is, all the normal information is recorded in the "process" fields of the processor-level fault areas and the fault code indicates that a processless process-level fault occurred.

If the fault does not correspond to a process-level fault, then the fault code indicates what function was being attempted.

5.3.6 Consistency Halts

If the processor-level fault mechanism cannot successfully complete its function due to improper descriptors or data structures, or unrecoverable hardware failure prevents the processor from accessing memory, the processor enters a consistency halt. It stops and asserts an external error condition.

5.4 DEBUGGING SUPPORT

The interface processor provides no direct support for debugging the external processor software using it. However, it's basic operating mode of logically halting after every action solves one of the basic problems of debugging: getting the processor to stop at points of interest.

5.5 LOW-LEVEL INITIALIZATION

At system initialization, the temporary segment table directory and associated data structures must be initialized prior to any processor beginning the initialization sequence. This information cannot preexist in the required locations (i.e., be encoded there in a ROM) because it is subjected to later change. The necessary information must therefore be moved into the specified locations from an image encoded in ROM or PROM elsewhere in the system. Since none of the processors in the system have yet qualified any of their address-development information, the processor performing this low level initialization must work at the processor address level. At power-up, map entry $\phi$ and the associated data segment, segment-descriptor register of interface processors are in a predefined state. This allows the required information movement to be performed via a designated interface processor by the associated external processor software.

5.6 INITIALIZATION AND SOFTWARE-CONTROLLED RESET

The same initialization sequence as employed on the generalized-data processor is used. Reset by main system software is done via the same interprocessor communication-based mechanism used with generalized data processors. Using the function-request facility to access the interprocessor-communication mechanism, external-processor software performs reset the same way as main system software.

5.7 ALARM HANDLING

When an alarm condition occurs, external devices that independently monitor system-alarm conditions, such as error-correction failures, bus response failures, or primary power failures, may force the suspension of all currently executing processes and cause the activation of critical alarm-handling processes. The alarm sequence is normally requested via an external hard-wired signal. Also, as noted above, for testing and development purposes, the alarm sequence may be requested by software via the interprocessor communication mechanism.

The alarm sequence proceeds as follows. If the processor is currently associated with a process, that process is set waiting and sent to its preemption port. If the processor is currently idle at a dispatching port, the processor object is dequeued from that port. From there it proceeds to qualify access to its alarm-dispatching port via the alarm-dispatching port access descriptor and the associated segment descriptor. Having reestablished a complete operational environment, the processor attempts to dispatch a process from its alarm-dispatching port. As with all requested functions performed by interface processors, upon completion of an alarm-response sequence, if enabled, a function complete interrupt is generated after appropriate processor-resident status information has been updated.

6.0 INTERFACE PROCESSOR FUNCTIONS

The functions provided by an interface processor are encoded into a common format that allows their interpretation to proceed in a single, logical sequence. A function consists of a series of fields that are organized to present information to the processor as it is needed. Decoding of these fields proceeds as follows: decode the operator and the number, type, and length of the operands; and perform the operator specified operation over the provided literal operands and store any result.

The general-function format for the IP contains two fields: the op-code and operands fields. These fields are stored in the registers of the function-request facility as shown in section 4. The following two subheadings in this section explain the encoding of these fields. The third and final subheading provides a detailed description of the actions of a processor as it interprets functions.

6.1 OP-CODE FIELD

The first field of a function is the op-code field. This field selects which of the operators is to be performed. It also specifies the number, type, and length of the operands to be used.

6.2 OPERANDS FIELD

The operands field of a function provides the literal data and access descriptor operands indicated by the op-code field.

Note again that once a given op-code has been decoded, the type and length of the following operands are known. An operand need not provide such information.

6.2.1 Data Operands

In all cases, the desired operand is encoded directly as a constant literal value in one of the function-request facility registers.

6.2.2 Access-Descriptor Operands

Interface processor access-descriptor operands are simply literal indirect segment selectors in the GDP sense. As with data operands, they are encoded directly as a constant literal value in one of the function-request facility registers. They provide support for access to both primary and secondary access lists. Primary access descriptor access supports specification of access descriptors within one of the four primary access lists of a context. Secondary access descriptor access supports specification of access descriptors within any access list for which there is an access descriptor in one of the four primary access lists of a contest.

These literal indirect segment selectors have the following organization:

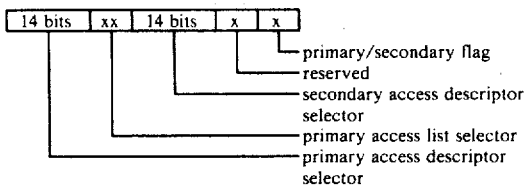

When the primary/secondary flag is clear, the high order 16 bits (the primary fields) are used to select an access descriptor within one of the four access lists of the current context (the primary access lists). When the primary/secondary flag is set, the result is access to an access descriptor in a secondary access list. First, the high order 16 bits (the primary fields) are used to select an access descriptor within one of the four access lists of the current context. The selected access descriptor provides access to a secondary access list. Then the secondary access descriptor selector is used to select an access descriptor within that access list.

6.3 FUNCTION INTERPRETATION

Before an individual function can be interpreted by a processor, appropriate process, domain, and context information must be loaded into the processor's registers. This forms an access environment in which logical addresses from a function can be translated to the physical addresses that reference memory. Once a proper access environment has been established and the execution of a function has been requested, the processor begins to interpret the function found in the function-request facility registers. The op-code field is decoded, the hardware operation specified by the operator is executed, and any result that is generated is written into the function-result field.

6.3.1 Physical Address Generation

Since the conversion process for access-descriptor operands requires data values from memory, this conversion generates logical addresses. Each of these logical addresses must, in turn, be converted to physical addresses.

The sequence of steps that must be carried out in order to generate a physical address are similar to those described in section 7 of the above-identified Colley et al patent application.

6.3.2 Execution

If all operand addresses are formed and all values fetched without any faults occurring, the hardware operation specified by the operator in the function is executed. Faults that are closely related to the actual manipulation of data or access descriptors may occur during this stage of function execution. Descriptions of these faults are contained with the detailed operator descriptions in section 7.

7.0 INTERFACE PROCESSOR OPERATOR SET

The operator set contains operators to manipulate the access environment (access environment manipulation operators) and operators to allow interaction between processes, and processors (communication operators). The operators in each of these classes are described below. Each description includes the number and type of required operands, a commentary on the operation performed, and a list of the type-related faults that can occur when an instruction containing the operator is executed.

7.1 ACCESS ENVIRONMENT MANIPULATION OPERATORS

The operators used for access environment manipulation are described below.

Except where explicitly specified, the operators described in this section are the same in structure and facility as the corresponding operators in section 8 of the above-identified Colley et al patent application. Thus, their detailed descriptions have been omitted below.

7.1.1 Access Descriptor Movement Operators

MOVE ACCESS DESCRIPTOR—2 access descriptor operands

MOVE ACCESS DESCRIPTOR allows an operation to move an access descriptor from a specified entry in any directly accessible access list to a specified entry in any directly accessible access list. The first operand specifies the access descriptor to be moved. The second operand specifies the destination access list entry.

COPY ACCESS DESCRIPTOR—2 access descriptor operands

COPY ACCESS DESCRIPTOR allows an operation to copy an access descriptor from a specified entry in any directly accessible access list to a specified entry in any directly accessible access list. The first operand specifies the access descriptor to be copied. The second operand specifies the destination access list entry.

NULL ACCESS DESCRIPTOR—1 access descriptor operand

NULL ACCESS DESCRIPTOR allows an operation to overwrite and thus logically clear a given access descriptor entry. At the same time, access to any object previously available via that access descriptor entry is given up. The operand specifies the destination access list entry.

7.1.2 Context Manipulation Operators

ENTER ACCESS LIST—1 access descriptor operand

ENTER ACCESS LIST allows an operation to gain direct access to the access descriptors in an access list to which it has base read rights. The operand specifies an access descriptor for the access list to be entered.

ENTER PROCESS ACCESS LIST

ENTER PROCESS ACCESS LIST allows an operation to gain direct access to the access descriptors in the access list provided implicitly via the currently associated process object.

Operator execution proceeds as follows. Fetch the access descriptor from the process access list entry of the current process object. If the access descriptor fetched is not an access list access descriptor, an access list type fault occurs. If the access descriptor fetched does not bear base read rights, an access list rights fault occurs.

Check that the entry access list entry contains a null descriptor, and if so, continue. Otherwise, perform path count decrementation on the associated segment descriptor. Alter the entry access list of the current context to be the access list entered on the processor. Store a copy of the new entry access list access descriptor, without duplicate or delete rights, in the entry-access list entry of the current context object. Perform path count incrementation and reclamation marking on the associated segment descriptor. Perform a selective cache flush on all entries associated with the entry-access list. Continue execution.

7.1.3 Map Manipulation Operators

ALTER MAP—5 data operands

ALTER MAP allows an operation to alter the inter-address space mapping provided by one of the address subrange map entries. The first operand is a double byte specifying which map entry is to be altered. The second operand is a double byte containing the starting address of the new subrange to be mapped. The third operand is a double byte containing the mask used to specify size of the new subrange. The fourth operand is a double byte containing new entry state information. If the new entry state information specifies that this entry is being set up in block transfer mode, the fifth operand is a double byte containing a count of the number operands to be transferred. Note that this operator is unique to interface processors.

Operator execution proceeds as follows. If the map entry to be altered is in block transfer mode and that transfer is not completed, and incomplete block transfer fault occurs. If the new peripheral address subrange is invalid, an invalid address subrange fault occurs. If the new peripheral address subrange overlaps the subrange in effect for any other valid map entry, an overlapping address subrange fault occurs. Once it has been determined that the map alteration information is valid, the given map entry is altered as specified. Then the segment valid bit in the entry state field is set to zero, logically invalidating the associated data segment, segment descriptor register information. Lastly, the map valid bit in the entry state field is set to one.

SELECT DATA SEGMENT—2 operands

SELECT DATA SEGMENT allows an operation to associate a given data segment with a given address subrange map entry. The first operand is a double byte specifying which map entry/data segment, segment descriptor register is to be used. The second operand specifies an access descriptor for the new data segment. Note that this operator is unique to interface processors.

Operator execution proceeds as follows. If the associated map entry is not valid, a map setup ordering fault occurs. If the associated map entry is in block transfer mode and that transfer is not completed, an incomplete block transfer fault occurs. Fetch the access descriptor selected by the segment selector operand. If the rights required by the transfer direction information in the associated map entry are not logically less than or equal to those available via the access descriptor used in data segment qualification, a data segment rights fault occurs. If the segment descriptor for the data segment being qualified is not valid, a segment validity fault occurs. If the segment for which access has been qualified is not of base-type data segment, a data segment-type fault occurs. Once it has been determined that the data segment selected is valid, the given segment descriptor register is altered as specified. Then the segment valid bit in the entry state field is set to one.

7.1.4 Type and Rights Manipulation Operators

APPLY TYPE—2 access-descriptor operands

APPLY TYPE allows an operation to apply a system type to an object and a set of rights and control information to an access path. The first operand specifies an access descriptor for the given object. The resultant new access descriptor overwrites the original access descriptor for the given object. The second operand specifies a transformer access descriptor.

RESTRICT RIGHTS—2 access descriptor operands

RESTRICT RIGHTS allow an operation to restrict its access to an object by altering, under control of an unprotected transformer, the access descriptor for that object to have either restricted rights or restricted rights and restricted descriptor control. The first operand specifies an access descriptor for the given object. The second operand specifies a data segment access descriptor. This segment will be used as a transformer object. The destination access list entry is the same as the source access list entry.

AMPLIFY RIGHTS—2 access descriptor operands

AMPLIFY RIGHTS allows an operation to amplify its access to an object by altering, under control of a protected transformer, the access descriptor for that object to have either amplified rights or amplified rights and amplified descriptor control. The first operand specifies an access descriptor for the given object. The second operand specifies a transformer access descriptor. The destination access list entry is the same as the source access list entry.

7.1.5 Label Manipulation Operators

APPLY PATH LEVEL
1 data operand
2 access-descriptor operands

APPLY PATH LEVEL allows an operation to apply a path level to an access path at a specified level. The first operand specifies an access descriptor for the path level descriptor to be applied. The second operand specifies an access descriptor for the level in the access path at which the path level is to be applied. The destination access list entry is the same as that specifying the access path. The third operand specifies a boolean operand which determines whether the path becomes opaque or transparent.

TRAVERSE—2 access-descriptor operands

TRANSPARENT PATH LEVEL

TRAVERSE TRANSPARENT PATH LEVEL allows an operation to traverse one level of an access path if the specified level is transparent. If so, the operation receives an access descriptor for the next lower level in the path as a result. The first operand specifies an access descriptor specifying the level in the access path which is to be traversed. The second operand specifies the destination access list entry.

TRAVERSE OPAQUE PATH LEVEL—3 access-descriptor operands

TRAVERSE OPAQUE PATH LEVEL allows an operation to traverse one level of an access path if both the specified level of that path is opaque and the value of a specified label is equal to that of the label accessible via that level of the access path. If so, the operation receives an access descriptor for the next lower level in the path as a result. The first operand specifies an access descriptor specifying the level in the access path which is to be traversed. The second operand specifies an access descriptor for the label to be compared. The third operand specifies the destination access list entry.

7.1.6 Segment Creation Operators

CREATE DATA SEGMENT
1 data operand
2 access-descriptor operands

CREATE DATA SEGMENT allows an operation to create a data segment and an access descriptor for it. The first operand is a double byte containing the length of the segment to be created. The second operand specifies a storage resource object access descriptor. The third operand specifies the destination access list entry.

CREATE ACCESS LIST
1 data operand
2 access-descriptor operands

CREATE ACCESS LIST allows an operation to create an access list and an access descriptor for it.

Operator execution proceeds as with CREATE DATA SEGMENT except that the allocated segment descriptor is marked with base-type access list and generic system type.

CREATE PATH LEVEL—3 access-descriptor operands

CREATE PATH LEVEL allows an operation to create a path level and an access descriptor for it. The first operand specifies the destination access list entry. The second operand specifies a storage resource object access descriptor. The third operand specifies a label object access descriptor.

7.1.7 Access Path Inspection Operators

READ ACCESS DESCRIPTOR
1 data operand
1 access-descriptor operand

READ ACCESS DESCRIPTOR allows an operation to read an access descriptor from any directly accessible access list and store it as data. The first operand specifies the access descriptor to be read. The specified access descriptor is stored, right justified, as a word result in the function result field.

READ SEGMENT DESCRIPTOR
1 data operand
1 access-descriptor operand

READ SEGMENT DESCRIPTOR allows an operation to read the segment descriptor information for any directly accessible segment and store it as data. The first reference specifies an access descriptor for the segment descriptor from which the information is to be read. The specified segment descriptor is stored as a double-word result in the function result field.

7.2 COMMUNICATION OPERATORS

The operators used for communication between processes and processors are described below.

Except where explicitly specified, the operators described in this section are the same in structure and facility as the corresponding operators in section 8 of the above-identified Colley et al patent application. Thus, their detailed descriptions have been omitted below.

7.2.1 Process Communication Operators

SEND—2 access-descriptor operands

SEND allows a process to send a message via a target port. The first operand specifies the message to be sent. The second operand specifies an access descriptor for the port through which the message is to be sent.

CONDITIONAL SEND
1 data operand
2 access-descriptor operands

CONDITIONAL SEND allows a process to check for the availability of message queuing space at a target port and to indivisibly send a message to that port if queuing space is available. The first operand specifies the message to be sent. The second operand specifies an access descriptor for the port through which the message is to be sent. If the message is sent, a boolean result of true is stored, right justified, in the function-result field.

CONDITIONAL RECEIVE
1 data operand
1 access-descriptor operand

CONDITIONAL RECEIVE allows a process to check for the availability of a message at a buffered port and to indivisibly accept it if one is available. The first operand specifies an access descriptor for the buffered port which the process desires to check for a message. If the message is received, a boolean result of true is stored, right justified, in the function-result field.

SIGNAL AFTER n TIME QUANTA—1 data operand

SIGNAL AFTER n TIME QUANTA provides a mechanism for external processor software to receive a signal after a delay of n time quanta. The operand is a double byte and contains the delay value. Note that this operator is unique to interface processors.

WAIT TO RECEIVE OR n TIME QUANTA
1 data operand
1 access-descriptor reference

WAIT TO RECEIVE OR n TIME QUANTA allows a process to send itself to a dispatching port so that it can be guaranteed that, if it has not received a message via a specified buffered port before a dispatching delay of n time quanta passes, it will become dispatchable again. The first operand is a double byte containing the dispatching delay value. The dispatching port used is the current service port of the process. The second operand specifies an access descriptor for the buffered port at which the process desires to wait to receive a message.

READ PROCESS IDENTIFICATION—1 data operand

The 16-bit process-identification number of the current process is read from the process object and stored, right justified, as a double-byte result in the function-result field.

READ PRINCIPAL IDENTIFICATION—1 data operand

The 16-bit principal-identification number of the current principal is read from the process object and stored, right justified, as a double-byte result in the function-result field.

7.2.2 Processor Communication Operators

SEND TO PROCESSOR—
2 data operands
1 access-descriptor operand

SEND TO PROCESSOR allows a process to send an interprocessor message to one specific processor, including the processor it is executing on, via the interprocessor communication mechanism. The first operand is a word containing the interprocessor message. The second operand specifies an access descriptor for the desired processor object. If the control flags are deposited, a boolean result of true is stored right justified, in the function-result field.

BROADCAST TO PROCESSORS 2 data operands
1 access-descriptor operand

BROADCAST TO PROCESSORS allows a process to broadcast an interprocessor message to all the processors in the system, including the processor it is executing on, via the interprocessor communication mechanism. The first operand is a double byte containing the interprocessor message. The second operand specifies an access descriptor for the desired processor object. If the control flags are deposited, a boolean result of true is stored right justified, in the function-result field.

READ PROCESSOR STATUS—1 data operand

The 16-bit processor status field of the current processor is read from the processor object and stored, right justified, as a double-byte result in the function-result field. The processor status field includes both processor unit number and processor status information.

PART II. INTERFACE PROCESSOR AND SYSTEM INTERCONNECTIONS

8.0 INTRODUCTION

Referring now to FIG. 3, several processing units, 200, 202, 204, share a common main memory, 206. Two types of processing units are described in the above-identified Colley et al Patent Application. The first type, 200, a generalized data processor (GDP) as described in Part I of the referenced specification, provides for a variety of programming situations of a general nature. The second type, 202, an input/output processor (IOP) as described in Part III of the referenced specification, provides for direct programmed control of microcomputer interfaces, 208, and for direct transfer of data between those interfaces and main memory, 206.

A third type of processor, 204, an Interface Processor (IP), provides for the interfacing of peripheral subsystem software with software in the main system and for the transfer of data between the peripheral subsystem memory, 210, and the main memory, 206. The IP is physically attached to the system through a bus interface, 205, in a manner similar to the attachment of other processors in the system.

The interface processor (IP) is the input/output channel for the system and has the responsibility for synchronizing and moving data between the main processor system address space and the input/output address space. Conceptually the IP plays two roles as viewed from either its peripheral subsystem or IP side. From the peripheral subsystem side the IP reacts like a memory device in that it receives address and command signals and responds with a READY (or XACK). From the main processor side the IP reacts as a processor with a limited instruction set capable of address generation and capable of performing a subset of the GDP communications operators. Also provided are mechanisms whereby the peripheral subsystem processor, 212, (8085/8086/8088, etc.) can communicate with a process running on a main processor, 200, or be controlled by that process.

To provide maximum peripheral subsystem bus design flexibility, the IP functions in one of four pinout modes. This allows a variety of peripheral subsystem configurations, existing and future designs, to be interfaced to the system. This is achieved by providing multiple sets of pinout functions which are directly compatible with MULTIBUS, 8085, 8086, and 8088. Selection of one of these pinout modes is via strap option pins PSB0 and PSB1. The following pin function descriptions are for the 8085, 8086, and 8088 systems.

8.1 PIN DESCRIPTIONS

| Pin Name | I/O | Description |
| --- | --- | --- |
| PSB0, PSB1 | I | Peripheral Subsystem Bus 0 and 1 Asserted High These two pins are strap-option pins which are used to select one of four modes for IP pinouts. These four pinout modes are to allow the IP to interface with either MULTIBUS, 8085, 8086, or 8088. The major logic switch is between MULTIBUS and COMPONENT BUS (8085, 8086, 8088) while pin differences between 8085, 8086, and 8088 are mostly limited to timing, signal inversion and 8/16-bit operation differences.<br>PSB1  PSB0<br>0      0      MULTIBUS<br>0      1      8085/8088 (min mode)<br>1      0      8086<br>1      1      8088 (max mode) |
| ADxx | I/O | Address and Data (15-0) 3 State Asserted High These lines constitute the multiplexed address and data input/output bus. An address, and CS/, is latched (if CS/ is low) by the ALE line. When ALE is not asserted, these lines are data. Their direction is given by read (RD/) as output from chip and write (WT/) as input to chip. The data drivers are in the Hi-Z state when RD/ is high or CS/ is high at ALE time. Note: after ALE, CS/ can change and the IP will remain selected until the next ALE, this removes the need to latch CS/external to the IP. The address is always a 16-bit unsigned number. Data may be either 16-bits or 8-bits, as configured prior to transfer. Eight-bit data may be transferred on either the high (D15-D8) or low (D7-D0) byte, determined by BHE/. Twenty bit addresses are accommodated by external decoding of the upper four address bits and use of the CS/input to the IP. |
| BHE/ | I | Bus Low Enable  Asserted Low  HiZ Pullup This line will tell the IP that data is to be on |

-continued

| Pin Name | I/O | Description |
|---|---|---|
| | | the high byte (D15-D8) during the data portion of a cycle. This line does not differentiate between 16-bit data and 8-bit data on the high byte (BHE/ is low in both cases). It is sampled by ALE. BHE/ should be left open for use with 8-bit processors. |
| ALE | I | Address Latch Enable   Asserted High<br>This line is used to capture and latch the address on the ADxx lines. Address is latched on the high-to-low transition. |
| CS/ | I | Chip Select   Asserted Low<br>This line must be low for the IP to capture and act on address, data and RD/, WT/. If high, the data outputs are HiZ. READY and INT are not HiZ. |
| IO/M/ | I | Memory/IO   Asserted High   HiZ Pullup<br>This line differentiates a memory address (IO/M/ Low) from an IO address (IO/M/ High) on ADxx of the peripheral subsystem. It is sampled simultaneously with ADxx by ALE. The IP will only respond to memory accesses, IO/M/ Low, and will ignore address and control information if IO/M/ is High. Note: The 8086 emits this control signal inverted (i.e., M/IO/). This will require that for an 8086 based peripheral subsystem M/IO/ will need to be inverted by TTL. |
| RD/ | I | Read   Asserted Low<br>This line is asserted to cause the IP to output the addressed data onto the peripheral subsystem bus. The data will be output in accordance with the 8/16 bit processor mode and the state of BHE/ (A0 has no effect on the high/low byte location of the output data). |
| WT/ | I | Write   Asserted Low<br>This line is asserted to cause the IP to input the data from the peripheral subsystem bus. The data will be input in accordance with the 8/16 bit processor mode and the state of BHE/ (latched). A0 has no effect on where IP gets data, but does effect where it is written in the target memory (i.e., A0 = 0 data goes into low byte of 16-bit word; A0 = 1 data goes into high byte). |
| READY | O | Ready   Asserted High<br>This line is asserted to prevent or end wait states in the processor on the peripheral subsystem bus. It indicates that the data will be available when the 8085/86/88 wants it on a read and will have been accepted by the IP on a write. |
| INT | O | Interrupt   Asserted High<br>This line is asserted to cause an interrupt to the 8085/86/88 processor. It is the inclusive OR of all IP interrupts. The status word must be read to determine the specific source of the interrupt. |
| DRQ0, 1 | O | DMA Request 0, 1   Asserted High<br>These lines are asserted to notify the DMA controller that MAP0 or MAP1 is ready for another transfer. The IP uses the addresses received on ADxx to decode its own DACK (DMA Acknowledge) and deassert DRQx. (for use with 8089 DMA) |
| ACD15-ACD0 | I/O | Address/Control/Data   Asserted High<br>ACD15-ACD0 constitute the time-multiplexed address/control/data bus lines between the IP and its associated bus interface. At various times during a memory cycle, the ACD lines carry address information, control information, and Read/Write data. These lines are sampled each clock at the falling edge of CLKA. |
| ALARM/ | I | Alarm   Asserted Low<br>The ALARM input signals the occurrence of an unusual system-wide condition (such as power fail). The IP does not respond to ALARM until it has completed the current IP operator or address mapping function (if any) being executed. ALARM is sampled on the rising edge of CLKA. |
| CLKA, CLKB | I | System Clocks<br>CLKA and CLKB provide the basic timing for the instruction unit. CLKB should lag CLKA by one-fourth of a cycle. |
| HERRIN/ | I | Hardware Error In   Asserted Low<br>HERRIN is used in systems employing Functional Redundancy Checking (FRC). A low on HERRIN |

| Pin Name | I/O | Description |
| --- | --- | --- |
| | | results in an FRC trap which causes the IP to quickly terminate any bus transaction in progress and execute the FRC microprogram. HERRIN is active low and is sampled at the rising edge of CLKA. |
| MASTER | I | Master Asserted High<br>This pin is used to reconfigure the IP as a checker in FRC configuration. By strapping this pin low the IP ceases to actively drive its output pins but instead, monitors them as inputs and compares their logic state with the internal state which would have driven the pin if not in FRC. Disagreement between the external and internal logic states causes the IP to assert HERROUT/. |
| HERROUT/ | O | Hardware Error Out Asserted Low<br>Assertion of HERROUT indicates that the checker IP disagrees with the signals that it is testing for FRC. The clock following this assertion HERROUT returns high. |
| INIT/ | I | Initialization Asserted Low<br>INIT causes the IP to immediately set itself to an initial state. |
| ISA/ | I | ISA Asserted Low<br>Refer to FIGS. 5 and 6.<br>ISA is a communication signal between an IP and its main system bus interface. ISA is normally held low by the IP whenever there is no transaction taking place between the IP and the bus interface and is high whenever a bus transaction is underway. ISA is also low for the first cycle of a bus transaction (at which time the IP is emitting the control information and low order bits of the address). During the second cycle of a bus transaction, a high on ISA indicates that the bus transaction is valid and the ACD lines contain the high order bits of the address. A low on ISA during the second cycle of the transaction indicates to the bus interface that the IP wishes to cancel the bus request. The IP will cancel a request if it has detected a bounds or access rights violation for the reference. |
| ISB/ | I | ISB Asserted Low<br>ISB is generated by the main system bus interface and monitored by the IP. A low on ISB when no bus transaction is in progess (ISA low) indicates to the IP that there is an interprocessor communication (IPC) waiting for it. In addition, ISB also has IPC significance during the first cycle of a bus transaction during which ISA is high. For the remainder of the bus transaction, ISB has stretch significance; except during the last cycle of a read transaction (FIG. 5) or the first cycle after a write transaction (FIG. 6). At those times, a low on ISB indicates a bus error. During times that ISB has stretch significance, a low on ISB during a read operation means that there is no valid data on the ACD lines; a low on ISB during a write operation indicates to the processor that it should not remove the write data that it is presenting on the ACD lines. |
| BIN/, BOUT | O | Bus In Asserted Low, Bus Out Asserted High<br>BIN and BOUT are used to control bus transceivers which buffer and isolate the IP from other IPs in heavily loaded systems. BIN is asserted when information is to enter the IP on the ACDxx lines. BOUT is asserted when the information is to leave the IP on the ACDxx lines. |
| FATAL | O | Processor Fatal Asserted High<br>FATAL indicates that the IP is unable to continue functioning. For example, at INIT or map initialization time if the IP, while qualifying a reference, finds an invalid segment table entry, at that point it is unable to continue productively. It can retry the sequence over and over, but that is of no use. |
| PCLK/ | I | PCLK Asserted Low<br>PCLK is a system-wide timing clock that is used for timing idle or waiting periods. PCLK runs |

-continued

| Pin Name | I/O | Description |
|---|---|---|
| | | at 1/500th the rate of CLKA. |

The following pin function descriptions are for IP interface to MULTIBUS. (PSB0=PSB1=VSS). Only the pin functions which change are described. All other pin functions are as described for the Intel 8085, 8086, and 8088 systems.

| Pin Name | I/O | Description |
|---|---|---|
| ADxx | I/O | Address and Data (15-0) 3 State Asserted High Same as before (8085/8086 use). MULTIBUS has separate address and data buses which will have to be multiplexed onto these lines. Normally address should be passed through to reduce set-up time. MULTIBUS convention defines that byte data is always transferred on the low (D7-D0) byte. |
| BHEN/ | I | Bus High Enable Asserted Low This line is asserted by the MULTIBUS to indicate a 16-bit transfer. BHEN/ unasserted when A0 is a one forces the IP to swap bytes (i.e., 8-bits go on lower byte only). |
| AEN/ | O | Address Enable Asserted Low This line serves to enable the MULTIBUS ADR 15-0/ onto the ADxx pins. It will be asserted as the normal idle condition. Upon receipt of a memory RD/ or WT/ command the IP chip examines the ADxx and if it is a proper address the AEN/ is deasserted which should be used to HiZ the ADR buffer (8286s). |
| DEN/ | O | Data Enable Asserted Low This line serves to enable the MULTIBUS DAT 15-0/ to the ADxx pins. It is mutually exclusive with AEN. It is active on both read and write. Timing conforms to MULTIBUS spec. |
| DR/R/ | O | Data Transmit/Receive Asserted High This line is used to control the direction of data flow through the data transceivers (e.g., 8286s). |
| RD/ | I | Read Asserted Low This line is driven by MULTIBUS MRDC/ (which removes the need for IO/M/ to be used). It meets all timing requirements of MRDC/ with respect to address and data. |
| WT/ | I | Write Asserted Low This line is driven by MULTIBUS MWTC/ (which removes the need for IO/M/ to be used). It meets all timing requirements of MWTC/ with respect to address and data. |
| XACK | O | Transfer Acknowledge Asserted High This line is used to notify the MULTIBUS master that write data has been accepted or that read data is available on the MULTIBUS. It meets all MULTIBUS XACK setup and hold specs. |
| INH1 | O | Inhibit 1 Asserted High Output when a valid mappable address range is detected. Used to override other RAM modules on MULTIBUS. INIT enables the use of INH1 and from then on, the current context-control segment will enable or disable the use of this function. |

9.0 GENERAL DESCRIPTION

Figure 4:
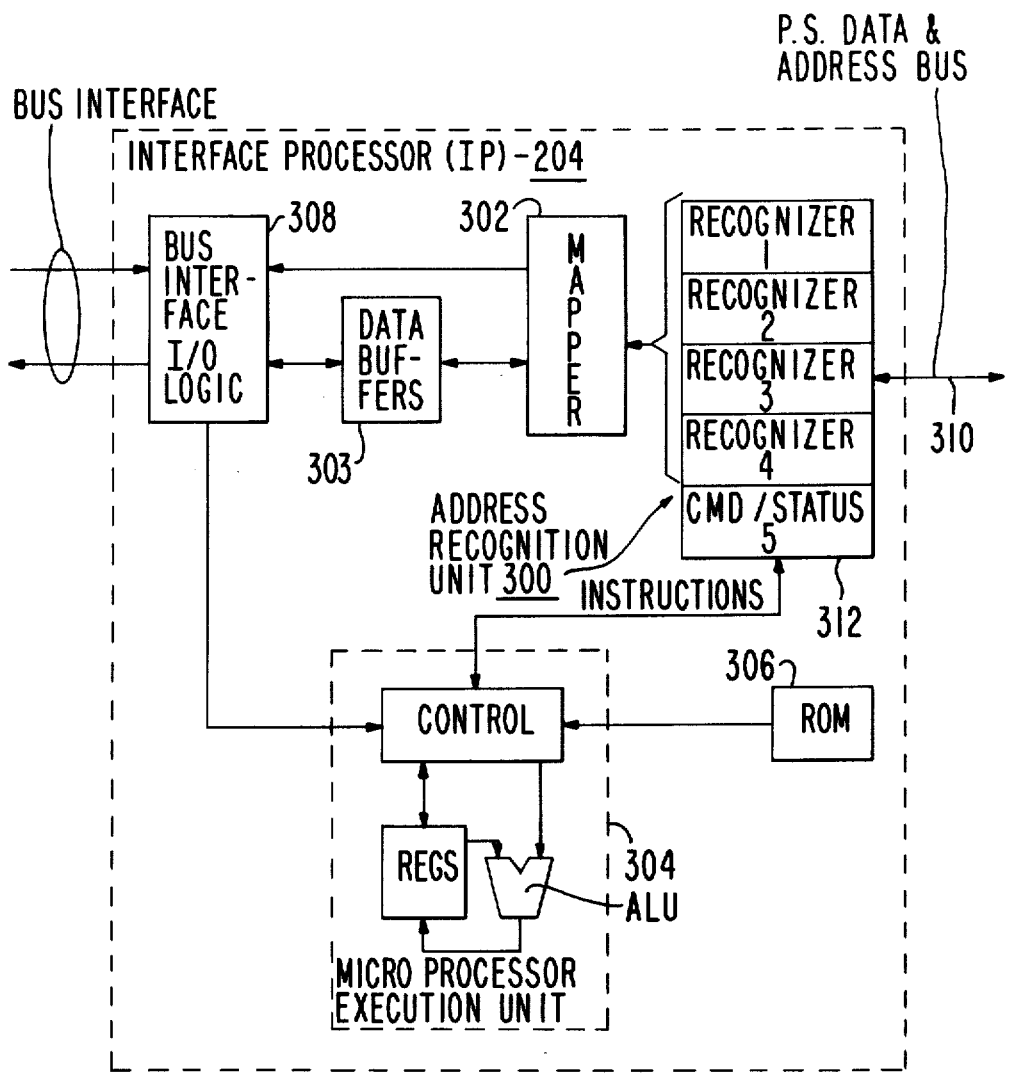
FIG. 4 is a more detailed block diagram of the interface processor shown in FIG. 3.

The IP serves as a window between the main processing system memory space and an 8085/8086/8088 based input/output system (peripheral subsystem). The major elements of the chip are shown in FIG. 4: address recognition, 300, address mapping, 302, microprocessor execution unit, 304, ROM, 306, and bus interface I/O logic, 308.

9.1 ADDRESS RECOGNITION

The IP can recognize five distinct address blocks in the peripheral subsystem address space. Each block consists of "2 to the n" bytes starting on a modulo "2 to the n" boundary (where $0 \leq n \leq 16$). These blocks may not overlap. To allow for a greater than 64K address space in the peripheral subsystem, the IP has a chip select input that can be used with external decoding logic.

The address recognition unit, 300, compares the memory address on the peripheral subsystem bus, 310, for each read or write that occurs, with mask and start address registers associated with each of its five address blocks. (For a detailed description of the mask and start address registers see section 4.2.1.1.1.) If an address falls within any of these blocks a match is generated and appropriate addressing fields are passed on to the mapper, 302. The recognizer can be set to function in one of three modes:

1. Random Mode: allows an external device to read or write single bytes or double bytes at random through the window. Data rates in this mode are the lowest as the full IP overhead is added to every access. The IP is initialized to byte transfers in Random Mode.

2. Pin Hole Mode: Allows an external device to sequentially access the IP at one specific address for a predetermined number of accesses. The IP keeps the current address and count internally. Each time the address recognition occurs, the address is incremented and the word count decremented. This mode allows 64K byte transfers without absorbing the whole 64K address space.

3. Swept Mode: Allows an external device to access the IP with sequential addresses for a predetermined count. The sequential nature of both pin hole and swept modes allows the IP to access memory in blocks of up to 8-bytes. To benefit from this the IP contains data buffers, 303, which are used for pre-fetching (on reads) and post-writing (on writes). This additional buffering is only provided for two of the recognizers and hence modes 2 and 3 are only supported on these two recognizers. The remaining address recognizers operate only in mode 1.

Modes 2 and 3 may be terminated by the count reaching zero or by an interprocessor communication requesting transfer termination.

Recognizer (5) acts as a COMMAND/STATUS register that occupies a portion of the peripheral subsystem address space. This register is physically located on the IP, but its contents are mapped into the current context-control object upon termination of any block transfer. This is useful for diagnostic purposes.

9.2 MAPPER

The IP mapper, 302, is very similar to the reference generation unit in the GDP execution unit (see section 10 of the above-identified Colley et al patent application). Each recognizer has associated with it a register which points to the base of a GDP execution unit data segment. (This register is equivalent to the GDP execution unit cache structure.) When a match is received from the recognizer this base address is added to a displacement which the recognizer computes from either the peripheral subsystem bus address or the on-chip, auto-increment address counter. Length and writes are also tested as in the GDP execution unit. Computation of the data segment base address is done by the IP each time a map window is assigned.

9.3 I/O LOGIC

This logic, 308, is similar to the GDP execution unit's ring communication logic (access sequencer), but lacks an on-chip top-of-operand stack. This logic handles all ring access protocol and has the same pinouts as described for the GDP execution unit. The I/O logic, 308, is more fully described in copending patent application Ser. No. 972,007 of Daniel K. Jackson, entitled "Microprocessor Interface Control Apparatus", filed on Dec. 21, 1978, and assigned to Intel Corporation, the assignee of the present application.

9.4 ROM

There are approximately 1K words of ROM storage on the IP to hold the microcode to execute the IP's limited set of GDP operators.

9.5 MICROPROCESSOR EXECUTION UNIT

This logic, 304, is optimized to execute a limited subset of the GDP instructions. The subset includes those necessary for the external peripheral subsystem processor to be able to control buffers and execute its tasks. The external processor makes requests by storing a copy of the desired instruction in the command register, 312, on the IP. Completion of the instruction is signaled in the status register, 312, and by an interrupt. A complete list and definition of the instructions is given in section 7.

10.0 PERIPHERAL SUBSYSTEM BUS OPERATION

The IP will work with an external 808X procesor. The 8086 provides the maximum throughput due to its 16-bit accesses, followed by the 8088 and last by the 8085.

The IP must be informed of what processor it is working with. This information is obtained via the strap option pins PSB0, PSB1, and is used to redefine certain pins, timings, and the ability to transfer 16-bit data on the peripheral subsystem bus.

There are two major variants which are selected by strapping PSB0 and PSB1 appropriately. Most system configurations will use the component bus pinout; only a restricted configuration would use the direct connection to the MULTIBUS.

Use of the IO/M/ input pin in component bus configuration, allows the IP to be either I/O mapped or memory mapped within the peripheral subsystem address space. The normal mode of operation will be to have the IP mapped within the memory address space. I/O/ must be low before the IP will respond to a RD/ or WT/ command; therefore, to place the IP within the I/O address space of the peripheral subsystem would simply require TTL inversion of the IO/M/ input. In MULTIBUS configuration the IP can similarly be I/O or memory mapped by connecting either IORC/ and IOWC/ or MRDC/ and MWTC/ to RD/ and WT/. Note the I/O address space of the 8086 and 8088 is 64K bytes but the I/O address space of the 8085 is only 256 bytes.

The IP can transfer data at high speed to and from the peripheral subsystem memory or peripherals through use of an 8089 DMA processor. The IP can also transfer data at high speed to and from peripherals that have a built-in DMA (e.g., 8257); however, an 8257 may not be used for IP to memory transfers due to the lack of DACK, I/OREAD and I/OWRITE lines on the IP. These transfers must be programmed by the peripheral subsystem processor.

11.0 SUMMARY OF INTERFACE PROCESSOR OPERATION

The Interface Processor appears to the remainder of the system as an object-oriented data processor similar to a generalized data processor, and is capable of manipulating the GDP environment in much the same way as a GDP data processor. That is, the Interface Processor has communication operators, move-access descriptors, and can manipulate labels and perform other environment manipulation operations. The Interface Processor also provides operators whereby the external processor, which is part of the peripheral subsystem, can control the address-mapping function. This includes map initialization and selecting data segments.

In a typical input/output operation, the peripheral subsystem address subranges to be mapped are set up by the external processor software through operators made available through the function-request facility. The association between address subranges and GDP data segments in main memory are also set-up by the external processor software.

A set of registers, the command register, provides for the implementation of a one-at-a-time command interface. The external processor utilizes this interface by writing a bit pattern into the command register. This bit pattern is a command to the Interface Processor to execute an operator, for example, a wait-to-receive-a-message operator. The IP uses the information in the command register to find the appropriate buffered port by means of the access information written in the context object associated with the IP. Upon locating the communication port, the IP will find an IO request message put there previously by a GDP process.

The IP places the access descriptor for the message into the context object for the IO process. The IP then signals completion by posting status in a set of registers provided for that purpose at the command interface, or by interrupting the external processor through an interrupt mechanism.

The external processor software receives the message at the time it responds the interrupt or upon testing the status registers. In response to this message and the information contained therein, the external processor software sets up the mapping facility and controls the transfer of data (a read or write) as requested in the message. The external processor issues addresses on its local bus. These addresses are recognized by the interface processor and those addresses which fall within a predetermined subrange are mapped into main memory by means of the mapper in the IP.

After transferring all of the data associated with the addresses specified in the message, the software on the external processor composes a completion message to be sent to the requesting GDP process. The external processor signals the GDP process by writing a bit pattern into the command register. This pattern represents a request that the information be sent back to a specified communication port through the interprocess communication mechanism. The external processor software is now free to return to the instruction code that requests another message, the wait-for-message operator. The operation just described is then repeated.

What has been described, is an interface processor which enables an external processor to interface with a main processor. The main processor is of a type capable of recognizing a complex object which defines an environment for execution of objects accessible to a given instance of a procedural operation. The environment exists in an address space associated with the main processor. The interface processor enables an external processor capable of referencing an IO address space to interface with the address space of the main processor. The interface processor includes a mapper for mapping an address range from the IO address space of the external processor onto the address space of the main processor. The interface processor also includes a function-request facility which provides the external processor software with a functional capability over certain objects within the address space of the main processor. Thus, software running on the external processor is provided with a window into the address space of the main processor. This window enables the external processor software, via the function-request facility, to send messages to and to receive messages from the main processor, and to manipulate an environment provided for the external software within the address space of the main processor.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. For use in a data processing system including a main processor of a type capable of executing an operation by means of an operator specified in an instruction, said operator being one of a set of main processor operators executable on said main processor, said system having instruction objects defining an operation, and data objects, said instruction objects and data objects being stored in a memory which can be shared by a number of processors, the instruction objects and data objects accessible to said main processor existing in an address space in said memory associated with said main processor, an interface processor which enables an external processor to interface with said memory and said main processor, said external processor being capable of referencing an I/O address space associated with said external processor, said interface processor comprising:

means for receiving addresses and commands from said external processor, one of said commands being a particular command including bits in said particular command specifying a particular operator;

recognizing means connected to said receiving means for comparing said addresses from said external processor with address registers associated with each of a number of address blocks, each of said blocks falling within a predetermined address range within the I/O address space of said external processor, said recognizing means including means for generating match signals, one match signal for each of said address blocks, one of said address blocks including command register means for receiving said particular command from said external processor;

means connected to said recognizing means responsive to said match signals for mapping said addresses within said address range from the I/O address space of said external processor onto the address space of said main processor;

function request means connected to said command register means, said function request means including means for executing a set of interface processor operators comprising access environment manipulation operators and communication operators in response to said match signal from said one of said address blocks containing said command register means, said set of interface processor operators being a subset of said main processor operators, one of said interface processor operators being said particular operator specified in said particular command, said function request means including means responsive to said bits in said particular command for executing said particular operator, whereby said external processor is able to make a request for the execution of said particular operator by said interface processor by sending an address corresponding to the address block in which said command register means is contained and writing a copy of said particular command into said command register means, said function-request means thereby being capable of being invoked by commands contained in instructions within the I/O address space of said external processor;

first interface means for connecting said mapping means and said function-request means with said memory; and, second interface means for connecting said address and command receiving means with said external processor;

whereby said external processor is provided with a window, via said recognizing means, into the address space of said main processor, said interface processor operators included in said function request means providing instruction set extensions to the operator set of said external processor to thereby allow a process executing on said external processor, via invoking execution of said communication operators on said function-request means, to send messages to said main processor, and to receive messages from said main processor, and via invoking execution of said access environment manipulation operators on said function-request means, to manipulate objects within said address space of said main processor.

2. The combination in accordance with claim 1 wherein, said mapping means for mapping said addresses within said address range from the I/O address space of said external processor onto the address space of said main processor consists of N map entries capable of supporting the random mapping of N nonoverlapping address subranges from said external processor into corresponding data segments of the address space of said main processor and wherein, said means connected to said receiving means for recognizing said addresses from said external processor includes means for recognizing that an address falls within one of said N address subranges within the I/O address space of said external processor.

3. The combination in accordance with claim 2 wherein one map entry of said N map entries and its associated external processor I/O address subrange always maps onto a current context-control segment within said address space of said main processor, whereby said external processor is able to have access to said context-control segment, thereby enabling said external processor to read current status information stored in said current context-control segment.

4. The combination in accordance with claim 3 wherein a copy of the information contained in each processor-resident map entry is represented within acid context-control segment by a data structure comprising a plurality of fields containing parameters for controlling and defining said mapped address range.

5. The combination in accordance with claim 4 wherein said data structure within said context-control segment includes a start address for specifying the starting address of the external processor address subrange mapped by said map entry and a displacement for specifying the extent of said subrange from said start address.

6. The combination in accordance with claim 3 wherein said function-request means is represented within said context-control segment by a data structure comprising a plurality of fields containing a copy of processor-resident information related to the current or most recent function requested, said information comprising function-state information, the op code of the operator requested, the operands operated upon in performing the requested function, and an area used to record the result of the requested function.

7. The combination in accordance with claim 1 wherein said access environment manipulation operators include a first map manipulation operator, the execution of which by said function-request means allows an operation on said external processor to alter the interaddress space mapping provided by one of said address subrange map entries.

8. The combination in accordance with claim 1 wherein said access environment manipulation operators include a second map manipulation operator, the execution of which by said function-request means allows an operation on said external processor to associate a given data segment with a given address subrange map entry.

9. The combination in accordance with claim 1 wherein said communication operators include a first communication operator, the execution of which allows an external processor to receive a signal after a delay of n times quanta.

10. The combination in accordance with claim 1 wherein at least one of said address blocks is dedicated to an I/O address subrange which maps, via said mapping means, onto a current context-control segment in said main processor address space, to thereby enable said external processor to have access to said context-control segment, thereby enabling said external processor to read current status information stored in said current context-control segment.

11. The combination in accordance with claim 1 wherein at least one of said address blocks has associated with it a register containing a segment descriptor which points to the base of a data segment within said main processor address space.

* * * * *

UNITED STATES PATENT AND TRADEMARK OFFICE
CERTIFICATE OF CORRECTION

PATENT NO. : 4,315,310
DATED : February 9, 1982
INVENTOR(S) : John Bayliss, et al.

It is certified that error appears in the above-identified patent and that said Letters Patent are hereby corrected as shown below:

Column 60, line 3, which reads "processor-resident map entry is represented within acid", should read --processor-resident map entry is represented within said--.

Signed and Sealed this

Twenty-second Day of June 1982

[SEAL]

Attest:

Attesting Officer

GERALD J. MOSSINGHOFF

Commissioner of Patents and Trademarks